(12) United States Patent
Ushiyama et al.

(10) Patent No.: US 9,373,064 B2
(45) Date of Patent: *Jun. 21, 2016

(54) INK JET PRINTING APPARATUS, INK JET PRINTING METHOD, AND IMAGE PROCESSING APPARATUS

(71) Applicant: CANON KABUSHIKI KAISHA, Tokyo (JP)

(72) Inventors: Takayuki Ushiyama, Kawasaki (JP); Yoshitomo Marumoto, Kawasaki (JP); Hiromitsu Yamaguchi, Yokohama (JP); Hitoshi Tsuboi, Kawasaki (JP); Ryota Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,449

(22) Filed: Dec. 9, 2014

(65) Prior Publication Data

US 2015/0178599 A1 Jun. 25, 2015

(30) Foreign Application Priority Data

Dec. 24, 2013 (JP) .................................. 2013-265364

(51) Int. Cl.
*G06K 15/10* (2006.01)
*B41J 2/21* (2006.01)

(52) U.S. Cl.
CPC ............. *G06K 15/102* (2013.01); *B41J 2/2132* (2013.01); *G06K 15/107* (2013.01)

(58) Field of Classification Search
None
See application file for complete search history.

(56) References Cited

U.S. PATENT DOCUMENTS

| 7,438,374 | B2 | 10/2008 | Shibata et al. |
| 7,699,436 | B2 | 4/2010 | Shibata et al. |
| 7,911,650 | B2 | 3/2011 | Jahana et al. |
| 8,328,329 | B2 | 12/2012 | Marumoto et al. |
| 8,919,905 | B2 | 12/2014 | Marumoto et al. |
| 2011/0148964 | A1* | 6/2011 | Mochizuki ............. B41J 2/2132 347/12 |
| 2012/0274951 | A1* | 11/2012 | Nishikori ............. G06K 15/102 358/1.2 |
| 2013/0328969 | A1* | 12/2013 | Azuma .................... B41J 2/145 347/44 |

FOREIGN PATENT DOCUMENTS

JP 2002-036524 A 2/2002

OTHER PUBLICATIONS

U.S. Appl. No. 14/564,442, filed Dec. 9, 2014.

* cited by examiner

*Primary Examiner* — Fan Zhang
(74) *Attorney, Agent, or Firm* — Fitzpatrick, Cella, Harper & Scinto

(57) ABSTRACT

An ink jet printing apparatus and an ink jet printing method capable of suppressing the occurrence of the texture or the feeling of granularity at a joint part even in the case where a thinning ratio in a boundary region is adjusted in order to reduce a joint streak are provided. To achieve such purposes, one dot arrangement pattern is set from a plurality of dot arrangement patterns for each pixel in accordance with a gradation level and a position on a printing medium. At this time, in a pixel region located at the joint part, a second dot arrangement pattern whose number of dots is different from a first dot arrangement pattern, which is set in the pixel region located at a part other than the joint part, is arranged so that low frequency components are less than high frequency components.

7 Claims, 27 Drawing Sheets

FIG.7A PATTERN SELECTION TABLE A

FIG.7B PATTERN SELECTION TABLE B

| 2 | 10 | 6 | 14 | 4 | 12 | 8 | 16 | 1 | 9 | 5 | 13 | 3 | 11 | 7 | 15 |
|---|---|---|---|---|---|---|---|---|---|---|---|---|---|---|---|
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 1 | 9 | 5 | 13 | 3 | 11 | 7 | 15 | 2 | 10 | 6 | 14 | 4 | 12 | 8 | 16 |

TABLE SETTING MATRIX α

FIG.8

| EVALUATION VALUE | DENSITY INCREASE/ DECREASE PARAMETER |
|---|---|
| 1020 | 0 |
| 960 | 1 |
| 900 | 2 |
| 840 | 3 |
| 780 | 4 |
| 720 | 5 |
| 660 | 6 |
| 600 | 7 |
| 540 | 8 |
| 480 | 9 |
| 420 | 10 |
| 360 | 11 |
| 300 | 12 |
| 240 | 13 |
| 180 | 14 |
| 120 | 15 |
| 60 | 16 |

FIG.9

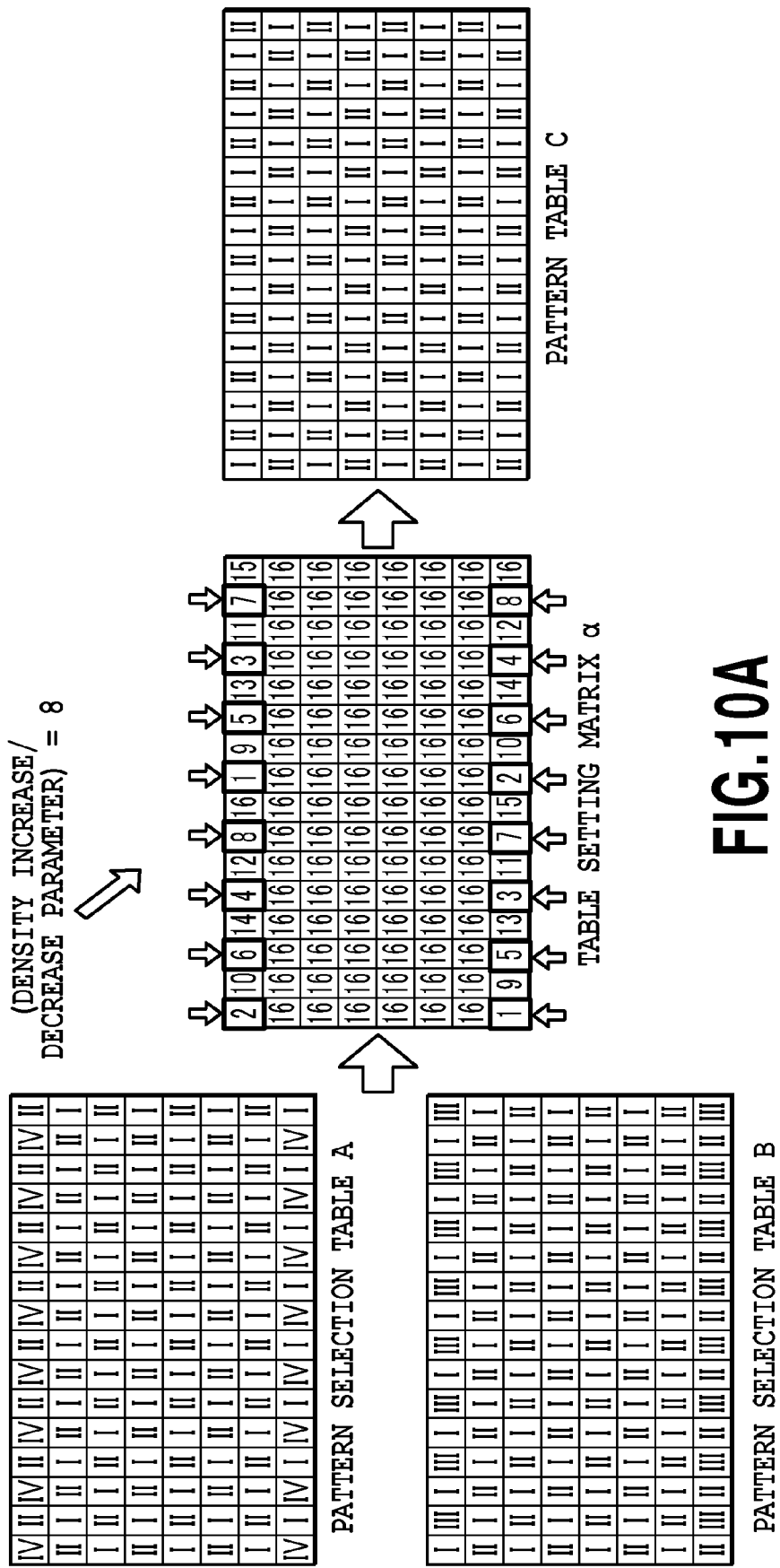

| DENSITY INCREASE/ DECREASE PARAMETER | DENSITY INCREASE/ DECREASE PARAMETER |
|---|---|
| 0 | −16 |
| 1 | −14 |
| 2 | −12 |
| 3 | −10 |
| 4 | −8 |
| 5 | −6 |
| 6 | −4 |
| 7 | −2 |
| 8 | ±0 |
| 9 | 2 |
| 10 | 4 |
| 11 | 6 |
| 12 | 8 |
| 13 | 10 |
| 14 | 12 |
| 15 | 14 |
| 16 | 16 |

FIG.11

| IV | II | IV | II | IV | II | IV | II | IV | II | IV | II | IV | II | IV | II |
|----|----|----|----|----|----|----|----|----|----|----|----|----|----|----|----|
| II | I  | II | I  | II | I  | II | I  | II | I  | II | I  | II | I  | II | I  |
| I  | II | I  | II | I  | II | I  | II | I  | II | I  | II | I  | II | I  | II |
| II | I  | II | I  | II | I  | II | I  | II | I  | II | I  | II | I  | II | I  |
| I  | II | I  | II | I  | II | I  | II | I  | II | I  | II | I  | II | I  | II |
| II | I  | II | I  | II | I  | II | I  | II | I  | II | I  | II | I  | II | I  |
| I  | II | I  | II | I  | II | I  | II | I  | II | I  | II | I  | II | I  | II |
| II | I  | II | I  | II | I  | II | I  | II | I  | II | I  | II | I  | II | I  |

PATTERN SELECTION TABLE D

FIG.12A

| I  | III | I  | III | I  | III | I  | III | I  | III | I  | III | I  | III | I  | III |
|----|-----|----|-----|----|-----|----|-----|----|-----|----|-----|----|-----|----|-----|
| II | I   | II | I   | II | I   | II | I   | II | I   | II | I   | II | I   | II | I   |
| I  | II  | I  | II  | I  | II  | I  | II  | I  | II  | I  | II  | I  | II  | I  | II  |
| II | I   | II | I   | II | I   | II | I   | II | I   | II | I   | II | I   | II | I   |
| I  | II  | I  | II  | I  | II  | I  | II  | I  | II  | I  | II  | I  | II  | I  | II  |
| II | I   | II | I   | II | I   | II | I   | II | I   | II | I   | II | I   | II | I   |
| I  | II  | I  | II  | I  | II  | I  | II  | I  | II  | I  | II  | I  | II  | I  | II  |
| II | I   | II | I   | II | I   | II | I   | II | I   | II | I   | II | I   | II | I   |

PATTERN SELECTION TABLE E

FIG.12B

| 1 | 9 | 5 | 13 | 3 | 11 | 7 | 15 | 2 | 10 | 6 | 14 | 4 | 12 | 8 | 16 |
|---|---|---|----|---|----|---|----|---|----|---|----|---|----|---|----|
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |

TABLE SETTING MATRIX β

|       | (I) | (II) | (III) | (IV) |
|-------|-----|------|-------|------|
| LEVEL 1 | 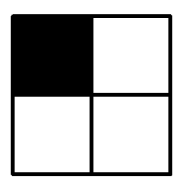 | 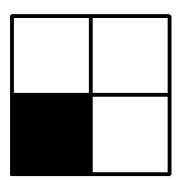 | 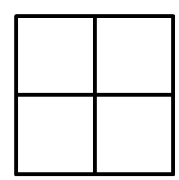 | 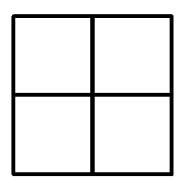 |
| LEVEL 2 | 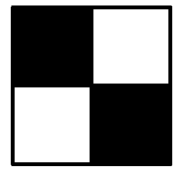 | 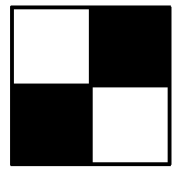 | 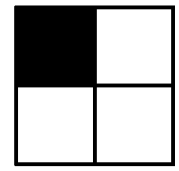 | 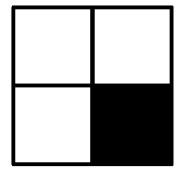 |
FIG.15

| I | II | I | II | I | II | I | II | I | II | I | II | I | II | I | II |
|---|----|---|----|---|----|---|----|---|----|---|----|---|----|---|----|
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |

PATTERN SELECTION TABLE F

FIG.17A

| IV | III | IV | III | IV | III | IV | III | IV | III | IV | III | IV | III | IV | III |
|----|-----|----|-----|----|-----|----|-----|----|-----|----|-----|----|-----|----|-----|
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| III | IV | III | IV | III | IV | III | IV | III | IV | III | IV | III | IV | III | IV |

PATTERN SELECTION TABLE G

FIG.17B

PATTERN SELECTION TABLE H

FIG.18A

PATTERN SELECTION TABLE I

FIG.18B

| I | II | I | II | I | II | I | II | I | II | I | II | I | II | I | II |
|---|----|---|----|---|----|---|----|---|----|---|----|---|----|---|----|
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |

PATTERN SELECTION TABLE J

FIG.20A

| I | II | I | II | I | II | I | II | I | II | I | II | I | II | I | II |
|---|----|---|----|---|----|---|----|---|----|---|----|---|----|---|----|
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| III | IV | III | IV | III | IV | III | IV | III | IV | III | IV | III | IV | III | IV |

PATTERN SELECTION TABLE K

FIG.20B

| 16 | 16 | 16 | 16 | 16 | 16 | 16 | 16 | 16 | 16 | 16 | 16 | 16 | 16 | 16 | 16 |
|----|----|----|----|----|----|----|----|----|----|----|----|----|----|----|----|
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 |
| 1  | 9  | 5  | 13 | 3  | 11 | 7  | 15 | 2  | 10 | 6  | 14 | 4  | 12 | 8  | 16 |

TABLE SETTING MATRIX γ

FIG.21

| I | II | I | II | I | II | I | II | I | II | I | II | I | II | I | II |
|---|----|---|----|---|----|---|----|---|----|---|----|---|----|---|----|
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |

PATTERN SELECTION TABLE L

FIG.22A

| III | IV | III | IV | III | IV | III | IV | III | IV | III | IV | III | IV | III | IV |
|-----|----|----|----|----|----|----|----|----|----|----|----|----|----|----|----|
| IV | III | IV | III | IV | III | IV | III | IV | III | IV | III | IV | III | IV | III |
| III | IV | III | IV | III | IV | III | IV | III | IV | III | IV | III | IV | III | IV |
| IV | III | IV | III | IV | III | IV | III | IV | III | IV | III | IV | III | IV | III |
| I | II | I | II | I | II | I | II | I | II | I | II | I | II | I | II |
| II | I | II | I | II | I | II | I | II | I | II | I | II | I | II | I |
| I | II | I | II | I | II | I | II | I | II | I | II | I | II | I | II |
| II | I | II | I | II | I | II | I | II | I | II | I | II | I | II | I |

PATTERN SELECTION TABLE M

FIG.22B

| 1  | 9  | 21 | 29 | 3  | 11 | 23 | 31 | 1  | 9  | 21 | 29 | 3  | 11 | 23 | 31 |
|----|----|----|----|----|----|----|----|----|----|----|----|----|----|----|----|
| 17 | 25 | 5  | 13 | 19 | 27 | 7  | 15 | 17 | 25 | 5  | 13 | 19 | 27 | 7  | 15 |
| 4  | 12 | 24 | 32 | 2  | 10 | 22 | 30 | 4  | 12 | 24 | 32 | 2  | 10 | 22 | 30 |
| 20 | 28 | 8  | 16 | 18 | 26 | 6  | 14 | 20 | 28 | 8  | 16 | 18 | 26 | 6  | 14 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |
| 32 | 32 | 32 | 32 | 32 | 32 | 32 | 32 | 32 | 32 | 32 | 32 | 32 | 32 | 32 | 32 |

TABLE SETTING MATRIX δ

FIG.23

INK JET PRINTING APPARATUS, INK JET PRINTING METHOD, AND IMAGE PROCESSING APPARATUS

BACKGROUND OF THE INVENTION

1. Field of the Invention

The present invention relates to an ink jet printing apparatus, an ink jet printing method, and an image processing apparatus.

2. Description of the Related Art

In a serial type ink jet printing apparatus, a printing scan in which a printing head is moved while causing the printing head to eject ink in accordance with image data and a conveyance operation to convey a printing medium in a direction intersecting the direction of the printing scan are repeated alternately. At this time, there is a case where a joint streak occurs at the boundary part between the regions in which printing is performed by printing scans performed twice successively in the printing medium.

For example, Japanese Patent Laid-Open No. 2002-36524 has disclosed the apparatus that counts the number of dots that are printed in the vicinity of the boundary part and adjusts the thinning ratio at the boundary part in accordance with the number of counted dots. How a joint streak is conspicuous depends on the number of gradations, i.e., the number of dots that are printed but by adopting Japanese Patent Laid-Open No. 2002-36524, it is possible to appropriately adjust the number of dots at the boundary part in accordance with the number of gradations, and therefore, it is made possible to make less conspicuous the joint streak regardless of the density.

However, in the case where the thinning ratio at the boundary part is adjusted in accordance with the gradation as in Japanese Patent Laid-Open No. 2002-36524, the dot arrangement state at the joint part is different from the dot arrangement state in the other region, and therefore, there has been such a case where the texture or the feeling of granularity inherent in the joint part occur and the joint streak is made more conspicuous on the contrary.

SUMMARY OF THE INVENTION

The present invention has been made in order to solve the above-described problems. Consequently, an object thereof is to provide an ink jet printing apparatus and an ink jet printing method capable of suppressing the occurrence of the texture or the feeling of granularity at the joint part even in the case where the thinning ratio at the boundary part is adjusted in order to reduce the joint streak.

In a first aspect of the present invention, there is provided an ink jet printing apparatus that prints an image on a printing medium by repeating a printing scan wherein an eject port column in which a plurality of eject ports for ejecting ink is arrayed is moved with respect to the printing medium and a conveyance operation to convey the printing medium in a direction intersecting the direction of the printing scan, the ink jet printing apparatus comprising: a unit configured to prepare a plurality of dot arrangement patterns in which the number and position of dots that are printed by ejecting ink from the eject port are determined in a region of a printing medium corresponding to each pixel in association with each of gradation levels indicated by image data of the pixel; and a setting unit configured to set one dot arrangement pattern from the plurality of dot arrangement patterns in accordance with the gradation level and the position of the pixel on the printing medium for each pixel, wherein, in a case where the gradation level of a plurality of pixels included in a pixel region is equal, the setting unit sets the dot arrangement pattern for each pixel such that a second dot arrangement pattern whose number of dots is different from that of a first dot arrangement pattern, which is set in a pixel region located at a part other than a joint part, is arranged in a pixel region located at the joint part that is formed by the printing scans performed twice so that low frequency components are less than high frequency components in a frequency range.

In a second aspect of the present invention, there is provided an ink jet printing method for printing an image on a printing medium by repeating a printing scan wherein an eject port column in which a plurality of eject ports for ejecting ink is arrayed is moved with respect to the printing medium and a conveyance operation to convey the printing medium in a direction intersecting the direction of the printing scan, the method comprising the steps of: preparing a plurality of dot arrangement patterns in which the number and position of dots that are printed by ejecting ink from the eject port are determined in a region of a printing medium corresponding to each pixel in association with each of gradation levels indicated by image data of the pixel; and setting one dot arrangement pattern from the plurality of dot arrangement patterns in accordance with the gradation level and the position of the pixel on the printing medium for each pixel, wherein, in a case where the gradation level of a plurality of pixels included in a pixel region is equal, in the setting step, the dot arrangement pattern is set for each pixel such that a second dot arrangement pattern whose number of dots is different from that of a first dot arrangement pattern, which is set in a pixel region located at other than a joint part, is arranged in a pixel region located at the joint part that is formed by the printing scans performed twice so that low frequency components are less than high frequency components in a frequency range.

In a third aspect of the present invention, there is provided an image processing apparatus that performs processing on multivalued image data corresponding to a unit region for printing an image in the unit region including a plurality of image regions on a printing medium by ejecting ink to each of the plurality of image regions on the printing medium in accordance with dot printing data corresponding to each of a plurality of times of scan, which is a plurality of times of relative scan by an eject port column in which a plurality of eject ports for ejecting ink is arrayed in a predetermined direction and the printing medium, and by conveying the printing medium between the plurality of times of scan, the image processing apparatus comprising: a first acquisition unit configured to acquire information on a density of an image that is printed in the pixel region from multivalued image data corresponding to the unit region; a second acquisition unit configured to acquire N ($\geq 3$)-valued quantized data corresponding to the unit region based on the multivalued image data; a third acquisition unit configured to acquire a plurality of dot arrangement pattern groups including at least a first dot arrangement pattern group including a plurality of first dot arrangement patterns in which an arrangement of dots is determined so that the number and position of dots that are printed within the pixel region are different in accordance with a value of the N-valued quantized data and a second dot arrangement pattern group including a plurality of second dot arrangement patterns in which an arrangement of dots is determined so that the number and position of dots that are printed within the pixel region are different in accordance with a value of the N-valued quantized data; a setting unit configured to set one dot arrangement pattern group among the plurality of dot arrangement pattern groups acquired by the third acquisition unit in accordance with the positions of the plurality of pixel regions within the unit region; and a generation unit configured to generate the dot printing data based on the N-valued quantized data acquired by the second acquisition unit and the dot arrangement pattern group set by the setting unit, wherein the number of dots that are printed within the pixel region determined by the second dot arrangement pattern corresponding to the N-valued quantized data having a predetermined value is smaller than the number of dots that are printed within the pixel region determined by the first dot arrangement pattern corresponding to the N-valued quantized data having the predetermined value, and the setting unit sets the dot arrangement pattern group such that the number of the second dot arrangement pattern groups determined for the plurality of pixel regions located at an end part of the eject port column in the predetermined direction within the unit region in a case where the density of the image indicated by the information acquired by the first acquisition unit is a first value is smaller than the number of the second dot arrangement pattern groups determined for the plurality of pixel regions located at an end part of the eject port column in the predetermined direction within the unit region in a case where the density of the image indicated by the information acquired by the first acquisition unit is a second value lower than the first value.

In a fourth aspect of the present invention, there is provided an image processing apparatus that performs processing on multivalued image data corresponding to a unit region for printing an image in the unit region including a plurality of image regions on a printing medium by ejecting ink to each of the plurality of image regions on the printing medium in accordance with dot printing data corresponding to each of a plurality of times of scan, which is a plurality of times of relative scan by an eject port column in which a plurality of eject ports for ejecting ink is arrayed in a predetermined direction and the printing medium, and by conveying the printing medium between the plurality of times of scan, the image processing apparatus comprising: a first acquisition unit configured to acquire information on a density of an image that is printed in the pixel region from multivalued image data corresponding to the unit region; a second acquisition unit configured to acquire N (≥3)-valued quantized data corresponding to the unit region based on the multivalued image data; a third acquisition unit configured to acquire a plurality of dot arrangement pattern groups including at least a first dot arrangement pattern group including a plurality of first dot arrangement patterns in which an arrangement of dots is determined so that the number and position of dots that are printed within the pixel region are different in accordance with a value of the N-valued quantized data and a second dot arrangement pattern group including a plurality of second dot arrangement patterns in which an arrangement of dots is determined so that the number and position of dots that are printed within the pixel region are different in accordance with a value of the N-valued quantized data; a setting unit configured to set one dot arrangement pattern group among the plurality of dot arrangement pattern groups acquired by the third acquisition unit in accordance with the positions of the plurality of pixel regions within the unit region; and a generation unit configured to generate the dot printing data based on the N-valued quantized data acquired by the second acquisition unit and the dot arrangement pattern group set by the setting unit, wherein the number of dots that are printed within the pixel region determined by the second dot arrangement pattern corresponding to the N-valued quantized data having a predetermined value is larger than the number of dots that are printed within the pixel region determined by the first dot arrangement pattern corresponding to the N-valued quantized data having the predetermined value, and the setting unit sets the dot arrangement pattern group such that the number of the second dot arrangement pattern groups determined for the plurality of pixel regions located at an end part of the eject port column in the predetermined direction within the unit region in a case where the density of the image indicated by the information acquired by the first acquisition unit is a first value is smaller than the number of the second dot arrangement pattern groups determined for the plurality of pixel regions located at an end part of the eject port column in the predetermined direction within the unit region in a case where the density of the image indicated by the information acquired by the first acquisition unit is a second value higher than the first value.

Further features of the present invention will become apparent from the following description of exemplary embodiments (with reference to the attached drawings).

BRIEF DESCRIPTION OF THE DRAWINGS

FIGS. 7A and 7B are diagrams showing pattern selection tables for dealing with a joint streak;

FIG. 8 is a diagram showing a table setting matrix $\alpha$;

FIG. 9 is a diagram showing a table for setting density increase/decrease parameters P from evaluation values;

FIGS. 10A to 10C are diagrams each showing a method for obtaining a pattern table at the time of printing;

FIG. 11 is a diagram showing density increase/decrease parameters and an increase/decrease in the number of dots in upper and lower end pixel rows;

FIGS. 12A and 12B are diagrams showing pattern selection tables for dealing with a joint streak;

FIG. 13 is a diagram showing a table setting matrix $\beta$ that can be used together with pattern selection tables D and E;

FIGS. 14A to 14C are diagrams each showing a method for obtaining a pattern table at the time of printing;

FIG. 15 is a diagram showing an example of a dot arrangement pattern that is used in the case where a black streak is problematic;

FIGS. 17A and 17B are diagrams showing pattern selection tables for dealing with a joint streak;

FIGS. 18A and 18B are diagrams showing pattern selection tables for dealing with a joint streak;

FIGS. 20A and 20B are diagrams showing pattern selection tables for dealing with a joint streak;

FIG. 21 is a diagram showing a table setting matrix $\gamma$ that can be used together with pattern selection tables J and K;

FIGS. 22A and 22B are diagrams showing pattern selection tables for dealing with a joint streak; and FIG. 23 is a diagram showing a table setting matrix δ that can be used together with pattern selection tables L and M.

DESCRIPTION OF THE EMBODIMENTS

Hereinafter, embodiments of the present invention are explained in detail with reference to the drawings.

<Explanation of Printing Apparatus>

Figure 1:
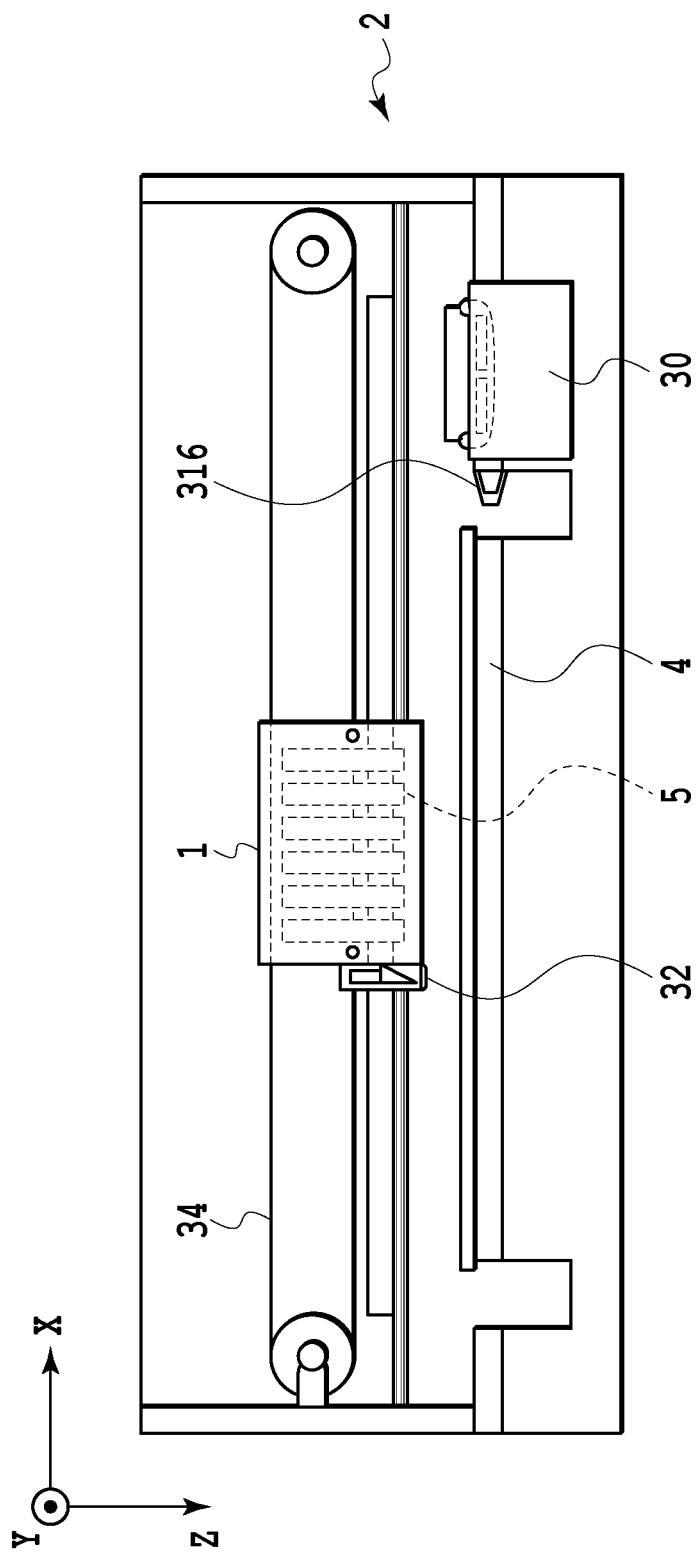
FIG. 1 is a sectional side elevation explaining a configuration of an ink jet printing apparatus that can be used in the present invention.

FIG. 1 is a sectional side elevation for explaining a configuration of a printing unit of an ink jet printing apparatus 2 (hereinafter, also referred to simply as a printing apparatus) that can be used in the present invention. A carriage 1 mounting six printing heads 5 and an optical sensor 32 is enabled to reciprocate in an X direction in FIG. 1 by a drive force of a carriage motor transmitted via a belt 34. While the carriage 1 is moving relatively in the X direction with respect to a printing medium, the printing head 5 ejects ink in a Z direction in accordance with printing data, and thereby, an image corresponding to one scan is printed on a printing medium arranged on a platen 4. After the one printing scan is completed, the printing medium is conveyed in a Y direction (conveyance direction) intersecting the X direction in FIG. 1 by a distance corresponding to a printing width of one scan. By alternately repeating the printing scan and the conveyance operation such as these a plurality of times, an image is formed gradually on the printing medium.

The optical sensor 32 determines whether or not there exists a printing medium on the platen 4 by performing the detection operation while moving together with the carriage 1. At a position in the scan region of the carriage 1 and apart from the platen 4, a recovery unit 30 configured to perform maintenance processing of the printing head 5 is arranged.

<Explanation of Printing Head>

Figure 2:
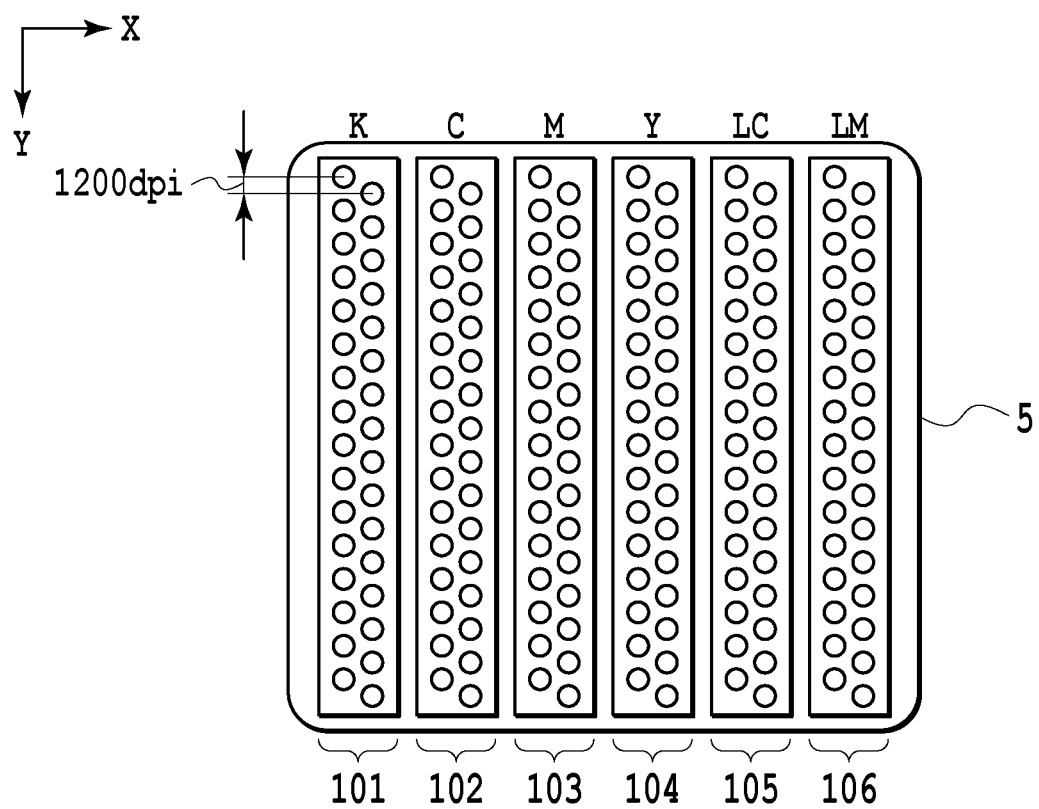
FIG. 2 is a diagram in the case where a printing head is viewed from an eject port surface side.

FIG. 2 is a diagram in the case where the printing head 5 is viewed from the eject port surface side. In the printing head 5, six eject port columns 101 to 106 are arranged in parallel in the X direction. In each of the eject port columns 101 to 106, a plurality of eject ports (here, 32 eject ports) for ejecting ink as a droplet is arrayed at a pitch of 1,200 dpi in the Y direction. The eject port columns 101 to 106 eject black (K), cyan (C), magenta (M), yellow (Y), light cyan (Lc), and light magenta (Lm) inks, respectively.

<Explanation of Control Unit>

Figure 3:
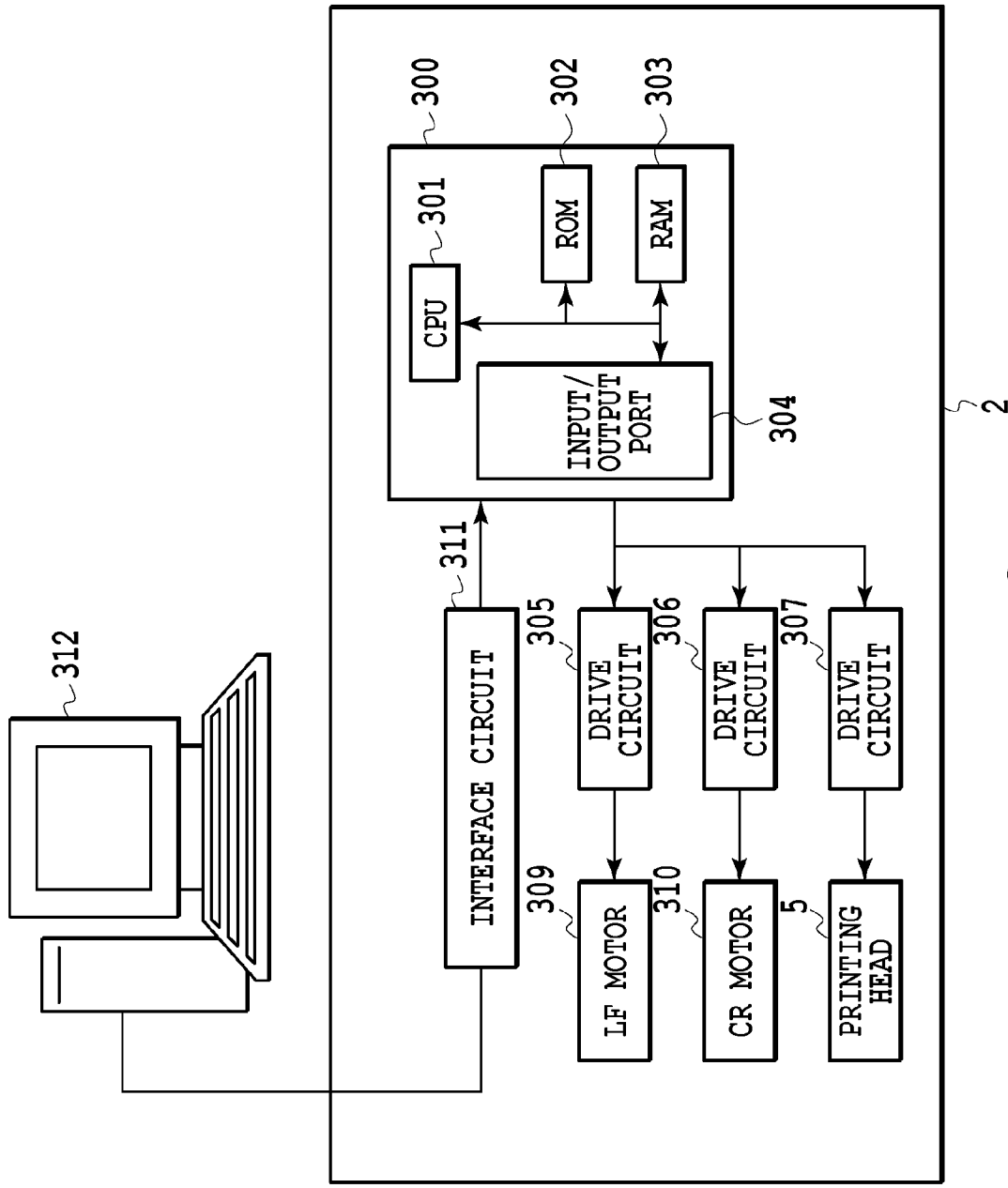
FIG. 3 is a block diagram showing an outline configuration of a control system in an ink jet printing apparatus 2.

FIG. 3 is a block diagram showing an outline configuration (printing control apparatus) of a control system in the ink jet printing apparatus 2. A main control unit 300 includes a CPU 301 that performs processing operations, such as arithmetic operation, selection, determination, and control, a ROM 302 storing programs etc. to be executed by the CPU 301, a RAM 303 used as a buffer etc. of printing data, an input/output port 304, etc. To the input/output port 304, drive circuits 305, 306, and 307 for driving each of an LF motor 309 for controlling the conveyance of the printing medium, a CR motor 310 for controlling the printing scan by causing the carriage 1 to reciprocate, and the printing heads 5 respectively are connected. Further, the main control unit 300 is also connected to a host computer 312 via an interface circuit 311. The characteristic control of the present invention that will be explained below is performed by a printer driver installed in the host computer 312 or performed by the CPU 301 of the printing apparatus 2 in accordance with the programs and various kinds of parameters stored in the ROM 302.

<Explanation of Printing Data Generation Processing>

Figure 4:
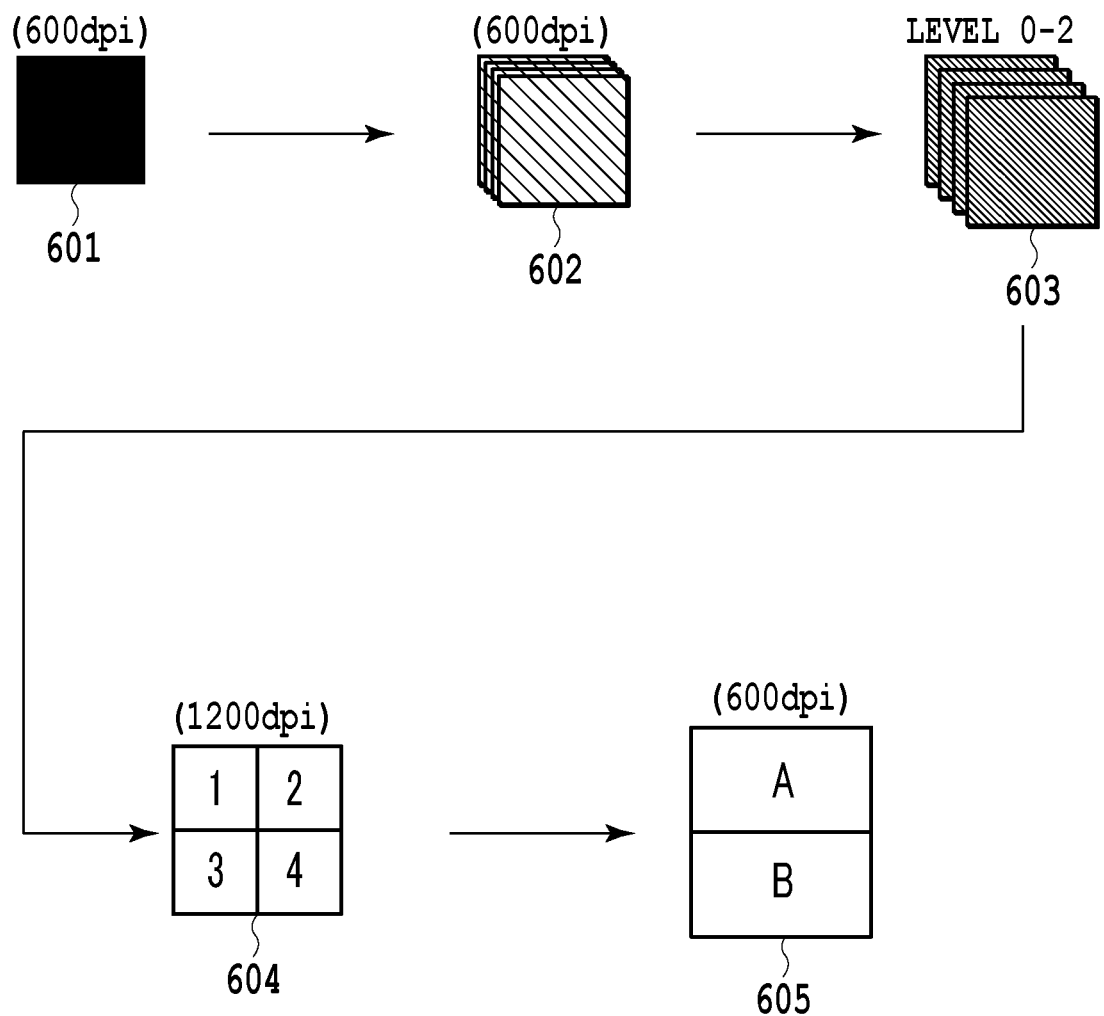
FIG. 4 is a diagram explaining image processing of the present invention.

FIG. 4 is a diagram explaining conversion processing of image data performed by the host computer 312 and the printing apparatus 2. Original image data 601 is 600 dpi RGB data and the printer driver first converts the image data 601 into 600 dpi density data 602 corresponding to the ink colors CMYKLcLm used by the printing apparatus 2. After that, by using the multivalued error diffusion method or the dither method, the density data 602 of each of CMYKLcLm is converted into quantized data 603 having three levels (number of gradations) of 0 to 2. Here, quantization into three-valued data is shown as an example, but a number N of values for quantization is not limited to three. The host computer 312 transfers the quantized data of each color in this state to the printing apparatus 2.

The CPU 301 having received the three-valued image data converts the 600 dpi quantized data 603 into 1,200 dpi binary printing data 604 by referring to a dot arrangement pattern stored in the ROM 302 in advance. Further, after performing processing characteristic to the present invention, as will be described later, the printing data is accumulated in a print buffer prepared within the RAM 303. The printing data is binary data that determines printing (1) or non-printing (0) for each of 2×2 pixels arrayed in 1,200 dpi.

After the printing data corresponding to one or more scans is accumulated, the CPU 301 performs a printing operation based on the printing data 604 in accordance with the program stored in the ROM 302. Specifically, the CPU 301 causes the printing head 5 to perform the eject operation while reading the binary printing data 604 by an amount corresponding to one scan each time. At this time, the printing resolution in the main scan direction may be set to 1,200 dpi, but it may also be set to 600 dpi. In the case of 600 dpi, the dots corresponding to printing data 1 and 2 put side by side in the main scan direction are printed repeatedly in a pixel position A as is known by referring to printing results 605. Dots corresponding to printing data 3 and 4 are printed repeatedly in a pixel position B. The CPU 301 prints an image corresponding to one page on a printing medium by causing the printing head 5 to perform the eject operation in accordance with the printing data 604 while controlling the drive of the various kinds of motors as required via the input/output port 304. Several embodiments according to the present invention will be explained below by using the printing system explained above.

First Embodiment

Figure 5:
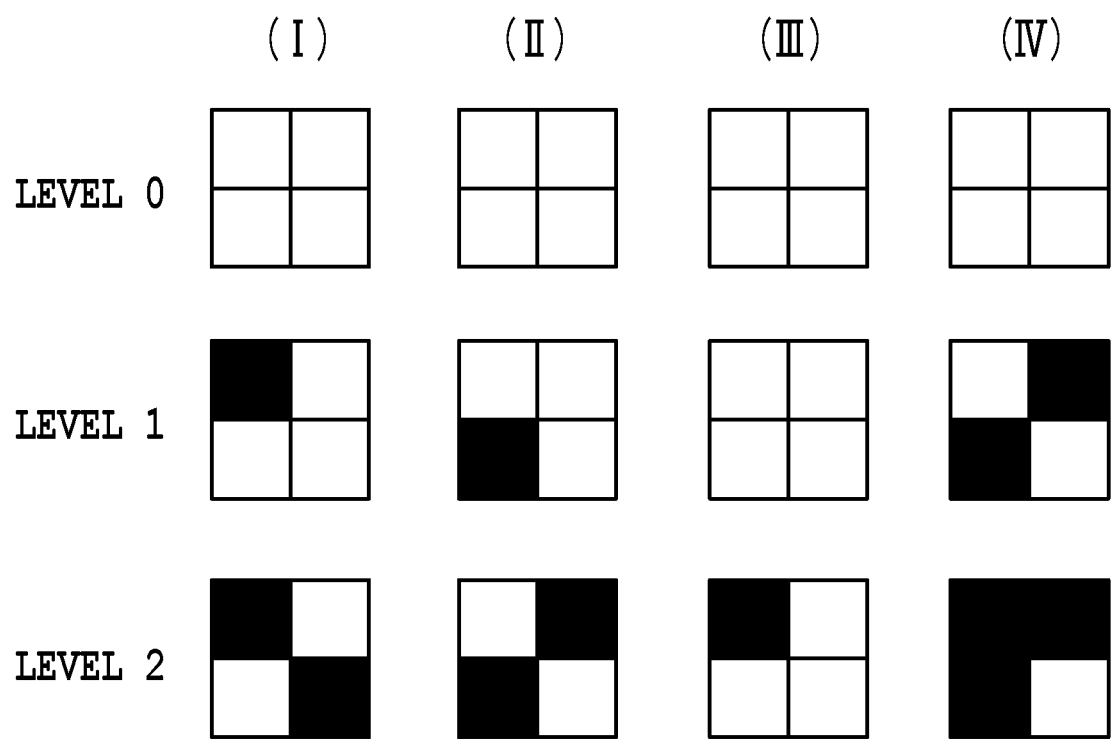
FIG. 5 is a diagram showing an example of a dot arrangement pattern stored in a ROM.

FIG. 5 is a diagram showing an example of a dot arrangement pattern stored in the ROM 302. The CPU 301 selects a dot arrangement pattern in which printing of dots (black) or non-printing of dots (white) is determined for each of 2×2 areas in accordance with 600 dpi quantized data indicating any of gradation levels 0 to 2. Usually, the number of dots that are printed in the 2×2 areas corresponding to the pixel regions increases as the level number increases, and here, four kinds of dot arrangement patterns I to IV in which the way the number increases is different from one another are prepared. Hereinafter, the contents of the dot arrangement patterns I to IV are explained specifically.

As to level 0, the number of printing pixels (area represented in black) is zero in each of the dot arrangement patterns I to IV. As to level 1, the number of dot printing pixels is one in the patterns I and II, that is zero in the pattern III, and that is two in the pattern IV. As to level 2, the number of dot printing pixels is two in the patterns I and II, that is one in the pattern III, and that is three in the pattern IV. By comparing the four kinds of patterns, it is known that in the patterns I and II, the number of printing pixels increases in regular order as the level number increases, but in the pattern III, the number of printing pixels is made less than that in the patterns I and II and in the pattern IV, the number of printing pixels is increased compared to that in the patterns I and II. It is known that a power of low frequency components in the frequency region included in the binary data generated by using the pattern III is larger than a power of low frequency components in the frequency region included in the binary data generated by using the patterns I and II. Further, it is also known that a power of high frequency components in the frequency region included in the binary data generated by using the pattern IV is larger than a power of high frequency components in the frequency region included in the binary data generated by using the patterns I and II. In the present specification, the pattern in which the number of dot printing pixels increases in regular order as the level number increases, as the patterns I and II, is referred to as a first dot arrangement pattern. The pattern in which the number of dot printing pixels is larger or smaller than that of the first dot arrangement pattern, such as the pattern III and the pattern IV, is referred to as a second dot arrangement pattern. In the present embodiment, these four kinds of dot arrangement patterns are prepared and at the boundary part where the black streak is comparatively apt to be conspicuous, the binarization processing is performed by using the pattern III in order to make the black streak no longer conspicuous by suppressing the number of dots. At the boundary part where the white streak is comparatively apt to be conspicuous, the binarization processing is performed by using the pattern IV in order to make the white streak no longer conspicuous by increasing the number of dots.

Figure 6:
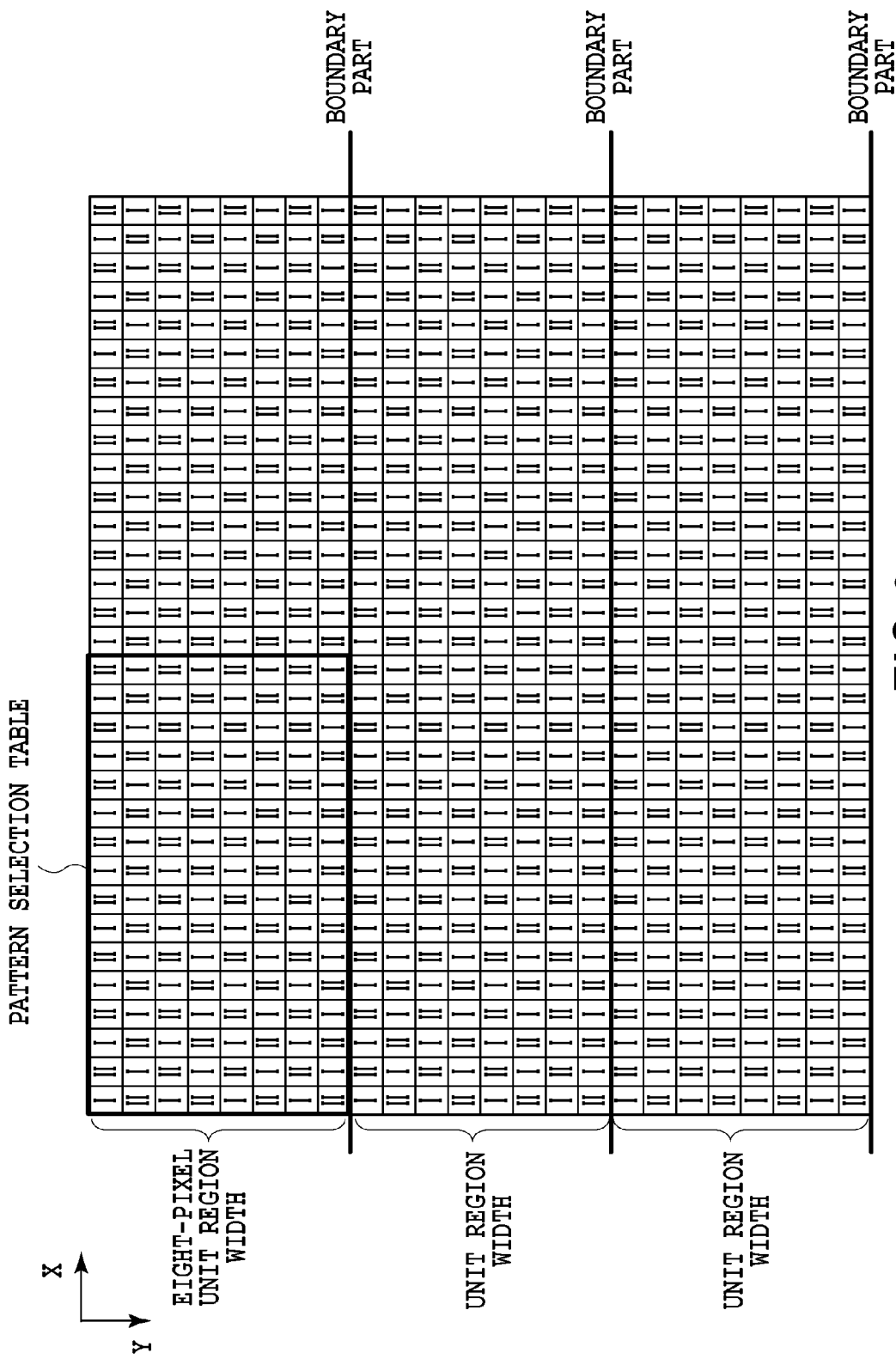
FIG. 6 is a diagram showing a pattern selection table for setting a dot arrangement pattern.

FIG. 6 is a diagram showing a pattern selection table for setting a dot arrangement pattern that is used in each of the pixels arrayed in 600 dpi. Here, in order to make explanation simple, the case is shown where one-pass printing is performed for a unit region on a printing medium by using each 16 eject ports of each eject port column. In this case, in the printing scan performed once, the 600 dpi unit region having a width of eight pixels is printed and in FIG. 6, the width in the Y direction of the unit region that is printed by the printing scan performed once is shown as a unit region width and the boundary part between each printing scan is shown as a boundary part between the unit regions. The pattern selection table has the region including eight pixels that agrees with the unit region width in the Y direction and 16 pixels in the X direction, and here, the pattern I or II is set in all the pixels within the pattern selection table. The pattern selection table is used repeatedly in the X direction (main scan direction) and in the Y direction (sub scan direction).

FIGS. 7A and 7B are diagrams showing pattern selection tables A and B for dealing with the joint streak that are used in the present embodiment. In the pattern selection table A shown in FIG. 7A, in the one-pixel width at the upper end, the patterns II and IV are set alternately and in the one-pixel width at the lower end, the patterns I and IV are set alternately. In the six-pixel width at the center except for the upper end and the lower end, the patterns I and II are set alternately. The one-pixel width at the upper end corresponds to two eject ports (first eject port group) 701 arranged at one end part of the eject port column and the one-pixel width at the lower end corresponds to two eject ports (second eject port group) 702 arranged at the other end part of the eject port column. Then, the region that is printed by the first eject port group 701 in the first printing scan performed earlier of the printing scans performed twice successively, and the region that is printed by the second eject port group 702 in the second printing scan performed following the first printing scan are arranged adjacent to each other on the printing medium and the boundary therebetween forms the joint part.

In the case where the pattern selection table A is used, in the one-pixel widths at the upper end and at the lower end, printing is performed with more dots increased by addition than those at the center as a result. In other words, the number of times of eject of the first eject port group 701 and the second eject port group 702 is increased compared to that of the eject ports other than these eject port groups. Because of this, the pattern selection table A will be a table effective in the case where the white streak is conspicuous at the boundary between the region that is printed by the first eject port group in the first printing scan and the region that is printed by the second eject port group in the second printing scan.

On the other hand, in the pattern selection table B shown in FIG. 7B, in the one-pixel width at the upper end, the patterns I and III are set alternately and in the one-pixel width at the lower end, the patterns II and III are set alternately. Then, in the six-pixel width at the center except for the upper end and the lower end, the patterns I and II are set alternately. In the case where the pattern selection table B is used, in the one-pixel widths at the upper end and at the lower end, printing is performed with less dots decreased by reduction than those at the center as a result. In other words, the number of times of eject of the first eject port group 701 and the second eject port group 702 is reduced. The pattern selection table B will be a table effective in the case where the black streak is conspicuous at the boundary between the region that is printed by the first eject port group in the first printing scan and the region that is printed by the second eject port group in the second printing scan.

The conspicuity of the black streak or the white streak is varies in accordance with the image density. For example, even in the case where printing is performed on the same printing medium by using the same ink, the black streak that is conspicuous in the low density may be less conspicuous in the high density. In such circumstances, in the case where the pattern selection table B shown in FIG. 7B is used at all times in order to reduce the black streak, dots are thinned uniformly by the dot arrangement pattern III for both level 1 and level 2. As a result of that, in the region configured mainly by level 2 where the density is high, there is a possibility that the white streak will occur due to excessive correction. In other words, it can be said that preferably, whether to use the pattern selection table A or the pattern selection table B is adjusted in accordance with the gradation value of each pixel. Because of this, a table setting matrix and a density increase/decrease parameter P for selecting an appropriate dot arrangement pattern in accordance with the gradation value are prepared.

FIG. 8 is a diagram showing a table setting matrix α. The table setting matrix α has a region of the same size as that of the pattern selection tables A and B, i.e., the region of 16 pixels in the main scan direction×eight pixels in the sub scan direction and in individual pixels, parameters 1 to 16 are allocated as in FIG. 8. In each pixel in the one-pixel width at the upper end and in the one-pixel width at the lower end, one and the different one of parameters 1 to 16 is allocated and in the six-pixel width region at the center, 16 is allocated uniformly. In the present embodiment, each parameter in the table setting matrix α is compared with the density increase/decrease parameter P. Then, based on the relationship in magnitude between both, whether the dot arrangement pattern is set in accordance with the pattern selection table A or the dot arrangement pattern is set in accordance with the pattern selection table B is determined. By doing so, it is possible to adjust the ratio in which the pattern selection table A and the pattern selection table B are set in the 16 pixels arranged at the upper and lower ends by setting the density increase/decrease parameter P large or small.

Here, a method for setting the density increase/decrease parameter P is explained. The density increase/decrease parameter P is adjusted so that the more conspicuous the white streak, the more the pattern selection tables A are set and the more conspicuous the black streak, the more the pattern selection tables B are set in an image that is printed. At this time, the conspicuity of the white streak or the black streak can be determined by, for example, the L*a*b* value that indicates the color tone, saturation, and lightness of the original image data, but here, the sum of the density data 602 of cyan C, magenta M, yellow Y, and black K in each pixel is used as an evaluation value in the pixel. In this case, the density data of one color ink takes a value between 0 to 255, and therefore, the evaluation value may take a value between 0 and 1,020. For example, the evaluation value of the pixel whose density data of cyan, magenta, yellow, and black is such that (C, M, Y, K)=(255, 255, 255, 255) is 1,020.

FIG. 9 is a diagram showing a table for setting the density increase/decrease parameter P of 0 to 16 from the evaluation value of 0 to 1,020. In this example, both are associated with each other so that the larger the value of the sum of the density data, the smaller the density increase/decrease parameter P is. In the case where the above example is cited, for example, in the pixel in which the density data is such that (C, M, Y, K)=(255, 255, 255, 255), the density increase/decrease parameter P is set to zero.

Figure 10B:
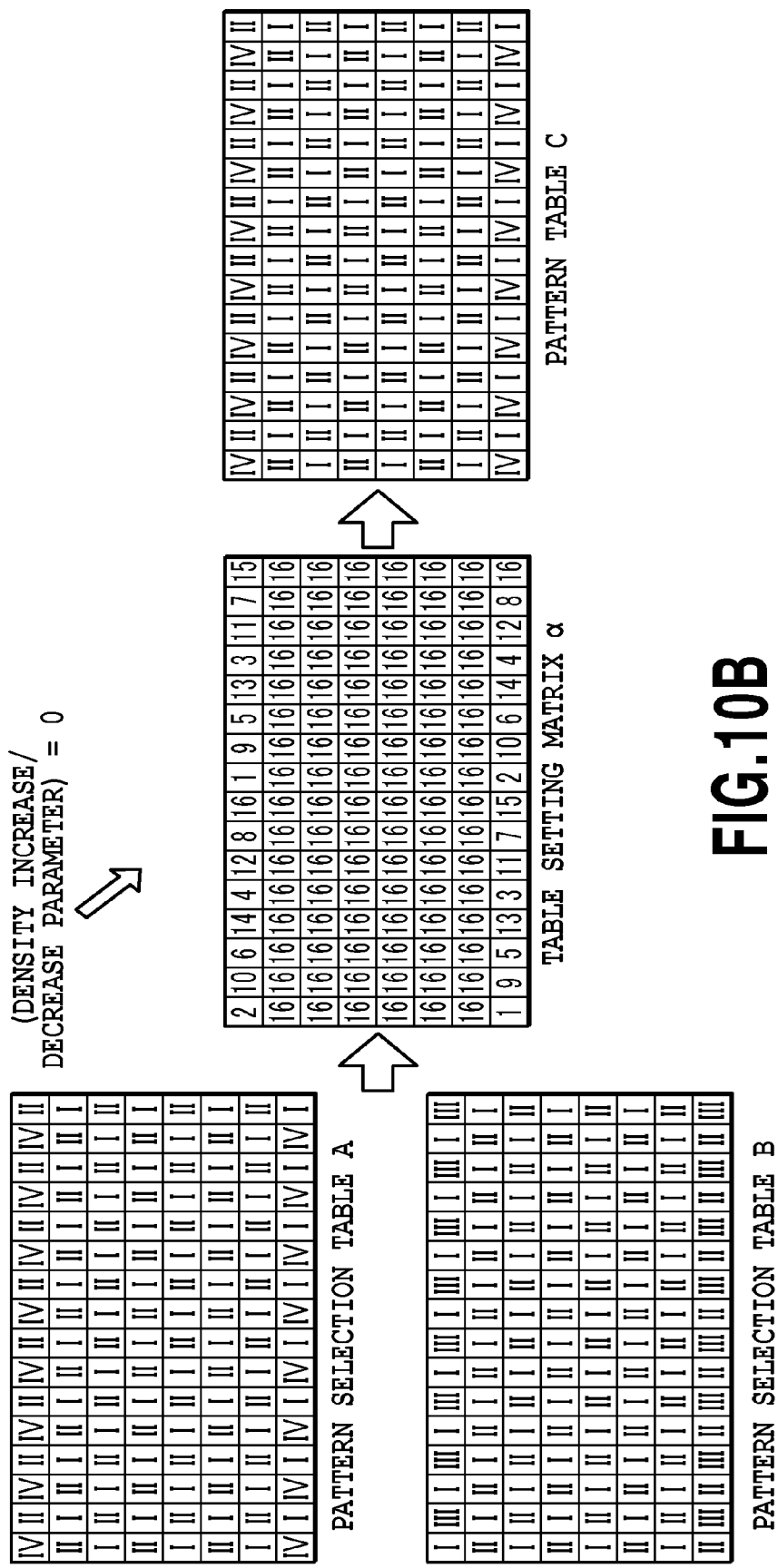
Figure 10C:
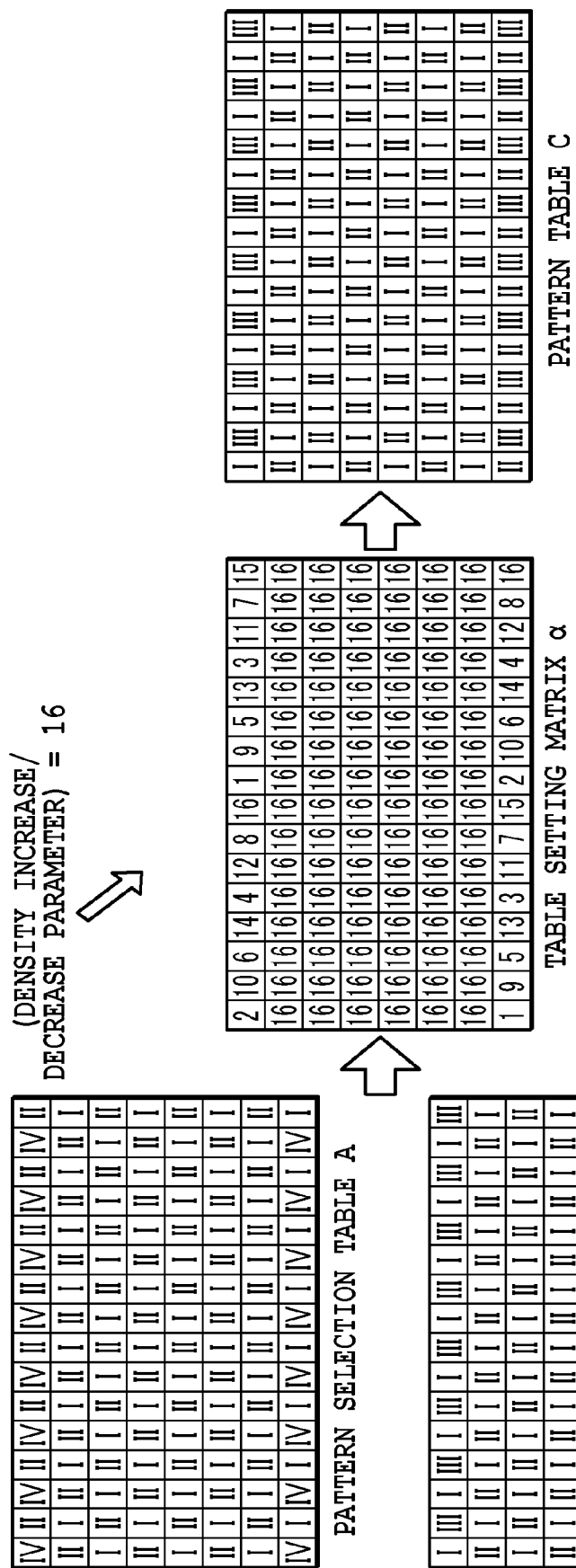

FIGS. 10A to 10C are diagrams each explaining a method for obtaining a pattern table C that is used actually at the time of printing from the table setting matrix α shown in FIG. 8 and the density increase/decrease parameter P selected by using the table in FIG. 9. FIG. 10A is a diagram showing the case where the density increase/decrease parameter P is set to "8" in all the pixels.

In the present embodiment, the dot arrangement pattern that is used in each pixel is determined by comparing the parameter set for each pixel by the table setting matrix α with the density increase/decrease parameter P. Specifically, in the case where the parameter of the table setting matrix α is larger than the density increase/decrease parameter P, to the pixel, the dot arrangement pattern set to the corresponding pixel of the pattern selection table A is allocated. On the other hand, in the case where the parameter of the table setting matrix α is equal to or less than the density increase/decrease parameter P, to the pixel, the dot arrangement pattern set to the corresponding pixel of the pattern selection table B is allocated.

For example, in the region except for the one pixel row at the upper and lower ends of the table setting matrix α, the parameter data is uniformly "16" and this is larger than the density increase/decrease parameter P="8". Consequently, in this region, the dot arrangement patterns I and II set in the corresponding region of the pattern selection table A are set exactly in accordance with the array. On the other hand, the parameters in the one pixel row regions at the upper and lower ends of the table setting matrix α are "1" to "16" and half the parameters are larger than the density increase/decrease parameter P="8" but the remaining half are equal to or less than the density increase/decrease parameter P="8". Because of this, in these regions, the dot arrangement pattern set in the pattern selection table A and the dot arrangement pattern set in the pattern selection table B are allocated alternately in accordance with the pixel position. As a result of that, in the pattern table C that is used actually at the time of printing, the dot arrangement patterns I and II are alternately arranged uniformly both in the pixel row regions at the upper and lower ends and in the other region.

Here, referring to FIG. 5 again, the dot arrangement patterns I and II of the present embodiment are patterns that do not cause the addition or reduction of dots. In other words, in the case where the density increase/decrease parameter P="8", the dot arrangement pattern I or II is used uniformly both in the boundary region, which forms a joint part, and in the non-boundary region, which forms a part other than the joint part, and no dots are added to or reduced from the boundary region as a result. In other words, in the case of the condition under which the white streak or the black streak is not conspicuous in particular, it is designed so that the density increase/decrease parameter P is set to "8". Then, in the table setting matrix α and in the pattern selection tables A and B, in the case where the density increase/decrease parameter P="8", the parameters of the individual pixels are set so that the dot arrangement patterns I and II are arranged alternately in all the pixel regions. In other words, the dot arrangement pattern I is arranged in the pixels within the pattern selection table A corresponding to the pixels in which parameters 9 to 16 are arranged within the pixel row regions at the upper and lower ends of the table setting matrix α, and the dot arrangement pattern II is arranged in the pixels within the pattern selection table B corresponding to the pixels in which parameters 1 to 8 are arranged within the pixel row regions at the upper and lower ends of the table setting matrix α.

On the other hand, FIG. 10B is a diagram showing the case where the density increase/decrease parameter P is set to "0" in all the pixels. The table setting matrix α and the pattern selection tables are the same as those in FIG. 10A. In the region except for the one pixel row at the upper and lower ends of the table setting matrix α, the parameters are uniformly "16" and are larger than the density increase/decrease parameter "0". Because of this, in this region, as in FIG. 10A, the dot arrangement patterns I and II set in the corresponding region of the pattern selection table A are set exactly in accordance with the array. On the other hand, the parameters in the pixel row regions at the upper and lower ends of the table setting matrix α are any of "1" to "16" and in all the pixels, parameters are larger than the density increase/decrease parameter P="0". Because of this, in these regions, the dot arrangement patterns I, II and IV are allocated alternately in accordance with the pattern selection table A in all the pixels. In other words, the pattern table C that is used actually at the time of printing will be the same as the pattern selection table A.

Here, referring to FIG. 5 again, the dot arrangement pattern IV that is arranged only in the one-pixel rows at the upper and lower ends is a pattern that causes the addition of dots. In other words, in the case where the density increase/decrease parameter P="0", correction is performed so as to add dots to half the pixels within the boundary regions (at the upper and lower ends). Further, the table setting matrix α in the present embodiment is set so that the number of pixel in which the dot arrangement pattern IV is arranged increases by one as the density increase/decrease parameter decreases by one in the range in which the density increase/decrease parameter is 0 to 8. Consequently, it is designed so that as the density increase/decrease parameter approaches 0 (i.e., the density of an image is high and the white streak becomes more apt to be conspicuous), the number of dots that are added to the boundary regions increases.

Further, FIG. 10C is a diagram showing the case where the density increase/decrease parameter P is set to "16" in all the pixels. The table setting matrix α and the pattern selection tables are the same as those in FIG. 10A. In the region except for the one pixel row at the upper and lower ends of the table setting matrix α, the parameters are uniformly "16" and are equal to the density increase/decrease parameter "16". Because of this, in this region, the dot arrangement patterns I and II set in the corresponding region of the pattern selection table B are set exactly in accordance with the array. On the other hand, the parameters in the pixel row regions at the upper and lower ends of the table setting matrix α are any of "1" to "16" and in all the pixels, the parameters are equal to or less than the density increase/decrease parameter "16". Because of this, in these regions, the dot arrangement patterns I and III are allocated alternately in accordance with the pattern selection table B in all the pixels.

Here, referring to FIG. 5 again, the dot arrangement pattern III that is arranged only in the one-pixel rows at the upper and lower ends is a pattern that causes the reduction of dots. In other words, in the case where the density increase/decrease parameter is "16", correction is performed so as to reduce dots in half the pixels within the boundary regions (at the upper and lower ends). Further, the table setting matrix α in the present embodiment is set so that the number of pixel in which the dot arrangement patterns III is arranged increases by one as the density increase/decrease parameter increases by one in the range in which the density increase/decrease parameter is 9 to 16. Consequently, it is designed so that as the density increase/decrease parameter approaches 16 (i.e., the density of an image is low and the black streak becomes more apt to be conspicuous), the number of dots that are reduced from the boundary regions increases.

FIG. 11 is a diagram showing the density increase/decrease parameter P and the number of dots that are increased or decreased in the pixel rows at the upper and lower ends of the table setting matrix in the present embodiment. In the case where the density increase/decrease parameter P=8, the dot arrangement patterns I and II (first dot arrangement pattern) are arranged alternately in all the pixel regions and the number of dots that are increased or decreased is ±0. The closer to 0 the density increase/decrease parameter P is, the larger the number of pixels in which the dot arrangement pattern IV (second dot arrangement pattern) is set becomes and the number of dots that are reduced gradually increases. On the contrary, the larger the density increase/decrease parameter P is, the larger the number of pixels in which the dot arrangement pattern III (second dot arrangement pattern) is set becomes and the number of dots that are added gradually increases.

As described above, according to the present embodiment, while one set of the table setting matrix α and the pattern selection tables A and B is used, the density increase/decrease parameter P is changed in accordance with conspicuity of the black streak or the white streak. Due to this, it is made possible to adjust the addition or reduction of dots so that the black streak or the white streak is no longer conspicuous.

Here, the table setting matrix α in FIG. 8 is referred to again. In the table setting matrix α, the dot arrangement patterns determined in the one pixel row at the upper end and in the one pixel row at the lower end are those in the pixel regions that are arranged side by side in the sub scan direction on the printing medium after printing. Such regions are also regions in which there is a great tendency for the dot arrangement states to differ compared to the center region (non-boundary region) in which parameter 16 is determined uniformly. Then, in the case where the texture or the feeling of granularity is caused by the dot arrangement in the regions, there is a possibility that the texture or the feeling of granularity will be recognized as a new joint streak.

More specific explanation is given. The center region (non-boundary region) in which the density increase/decrease parameter P is uniformly 16 is formed by the array of the first dot arrangement pattern including the same number of dots. On the other hand, in the pixel regions of the one pixel row at the upper end and the one pixel row at the lower end, the smaller the value in the pixel, which is one of 1 to 16 that the density increase/decrease parameter P can take, the greater the probability that the second dot arrangement pattern will be set. Then, the presence of the second dot arrangement pattern will cause the texture or the feeling of granularity due to a difference in the dot arrangement in the case where the second dot arrangement pattern is printed in the group of the first dot arrangement patterns. However, in the case where the second dot arrangement patterns are arranged in a sufficiently dispersed state, the possibility that the texture or the feeling of granularity will be visually recognized is faint. On the contrary, in the case where the pixels in which the second dot arrangement pattern is arranged are arranged concentratedly, the possibility that the texture or the feeling of granularity will be recognized is raised.

Consequently, in the table setting matrix α in the present embodiment, the parameter of each pixel is determined so that parameters 1 to 16 are arranged in the Bayer arrangement in the state where the one-pixel width at the upper end and the one-pixel width at the lower end are arranged adjacent to each other on the printing medium. By using the table setting matrix α, the pixels whose dot arrangement is different from that in the non-boundary region are arranged in a sufficiently dispersed state, and therefore, it can be expected to eliminate the joint streak without causing the texture or the feeling of granularity.

Second Embodiment

In the first embodiment, explanation is given by using the configuration in which the number of dots is adjusted both in the one-pixel width at the upper end and in the one-pixel width at the lower end of the unit region. However, in the printing scans performed twice successively, the joint streak does not necessarily appear in symmetry with respect to the boundary part as a center. There is a case where the joint streak appears at a position above the boundary part, i.e., on the side on which printing is performed by the preceding printing scan, or a case where the joint streak appears at a position below the boundary part, i.e., on the side on which printing is performed by the subsequent printing scan. In view of such circumstances, in the present embodiment, a configuration is explained, in which a correction width is set at only one of the upper end and the lower end of the eject port column (i.e., at only one of the upper end and the lower end of the pattern selection table).

FIGS. 12A and 12B are diagrams showing pattern selection tables D and E that are used in the case where the number of dots in the one pixel row at the upper end of the unit region is adjusted. In the pattern selection table D shown in FIG. 12A, in the one-pixel width at the upper end, the patterns II and IV are set alternately and in the seven-pixel width except for the upper end, the patterns I and II are set alternately. In the case where the pattern selection table D is used together with the dot arrangement pattern shown in FIG. 5, in the one-pixel width at the upper end, printing is performed with more dots than those at the center.

In the pattern selection table E shown in FIG. 12B, the patterns I and III are set alternately in the one-pixel width at the upper end and in the seven-pixel width except for the upper end, the patterns I and II are set alternately. In the case where the pattern selection table E is used together with the dot arrangement pattern shown in FIG. 5, in the one-pixel width at the upper end, printing is performed with less dots than those at the center.

FIG. 13 is a diagram showing a table setting matrix β that can be used together with the above-described pattern selection tables D and E. In each pixel in the one-pixel width at the upper end, one and the different one of parameters 1 to 16 is allocated and in the other seven-pixel width region, 16 is allocated uniformly.

Figure 14A:
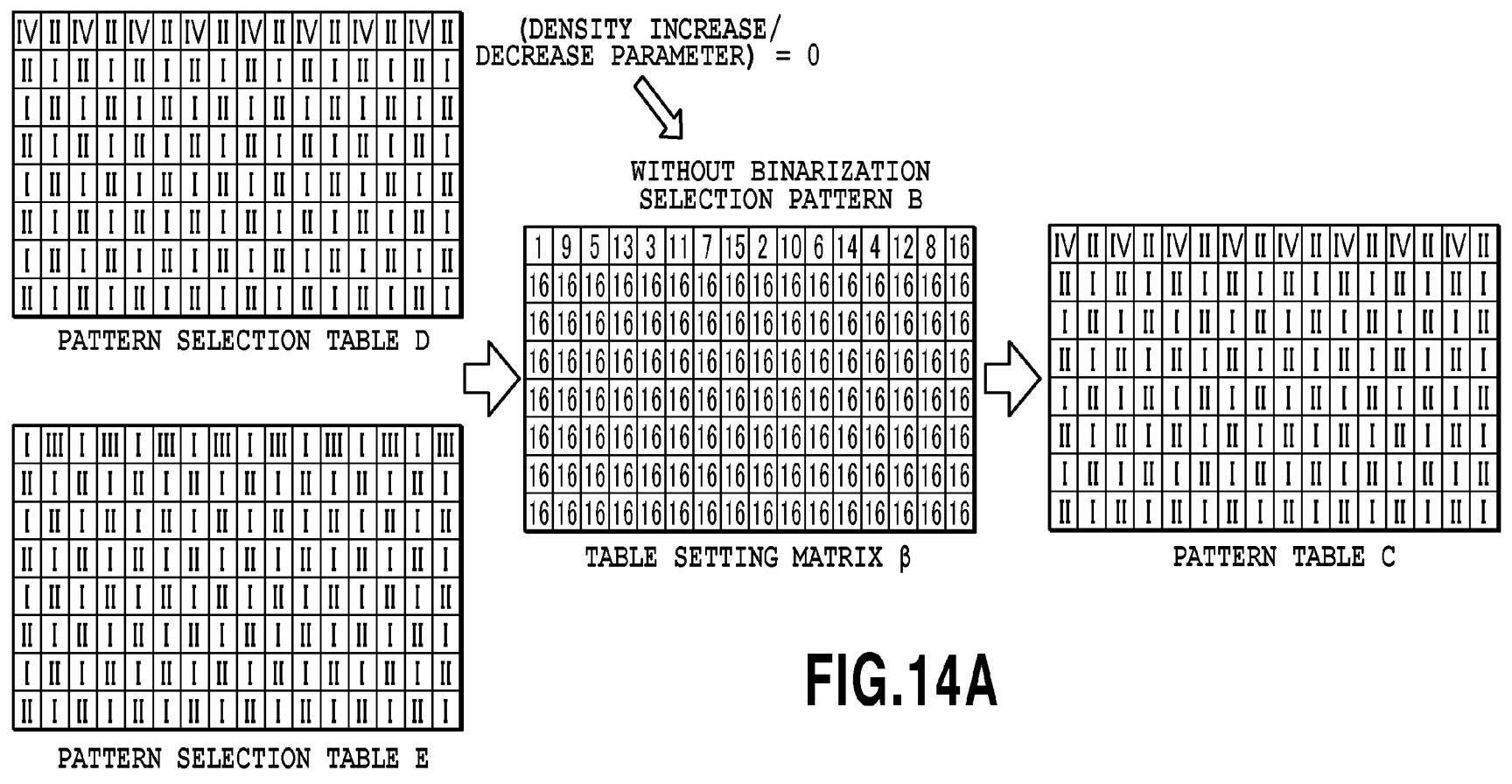
Figure 14B:
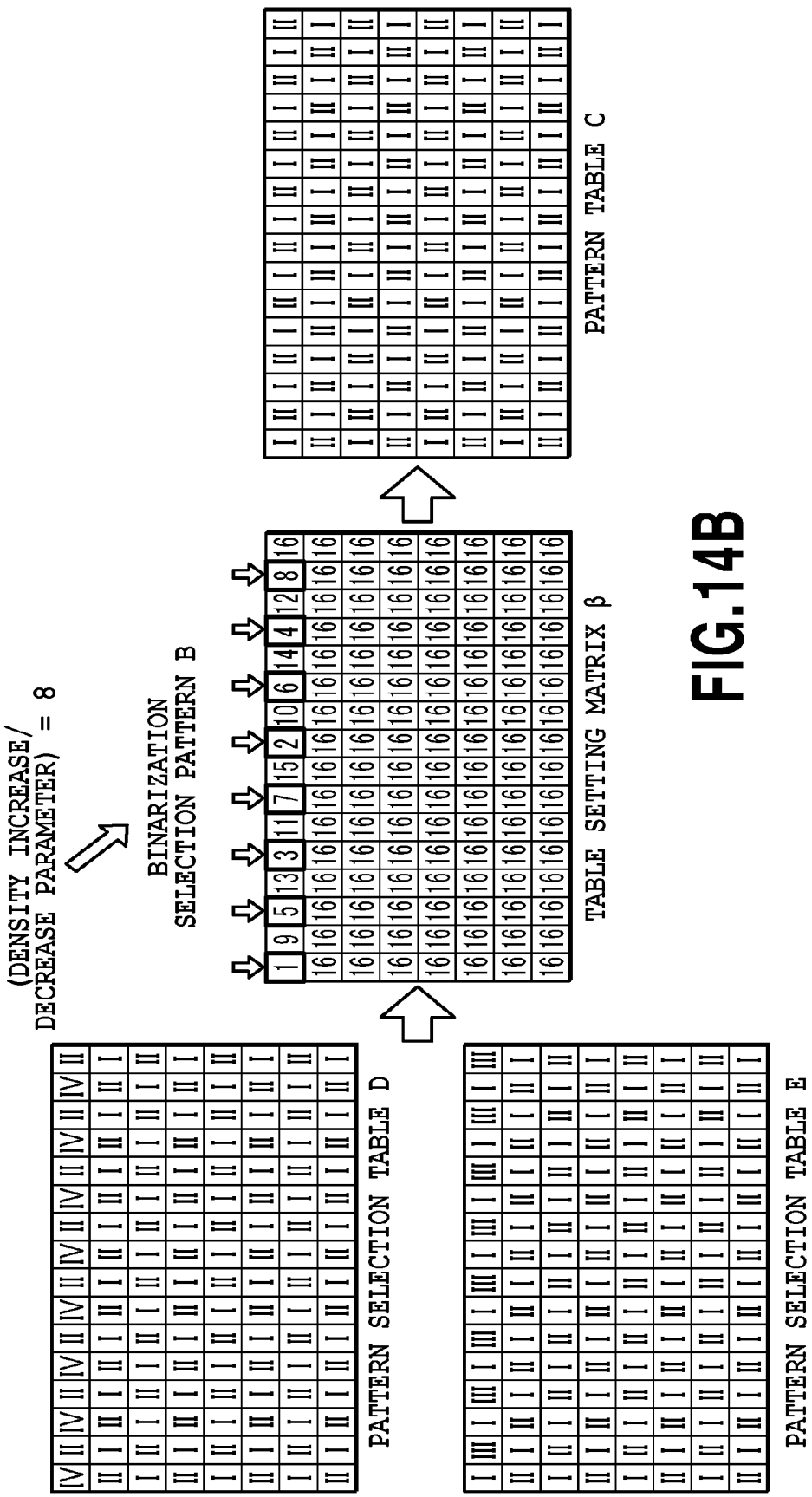
Figure 14C:
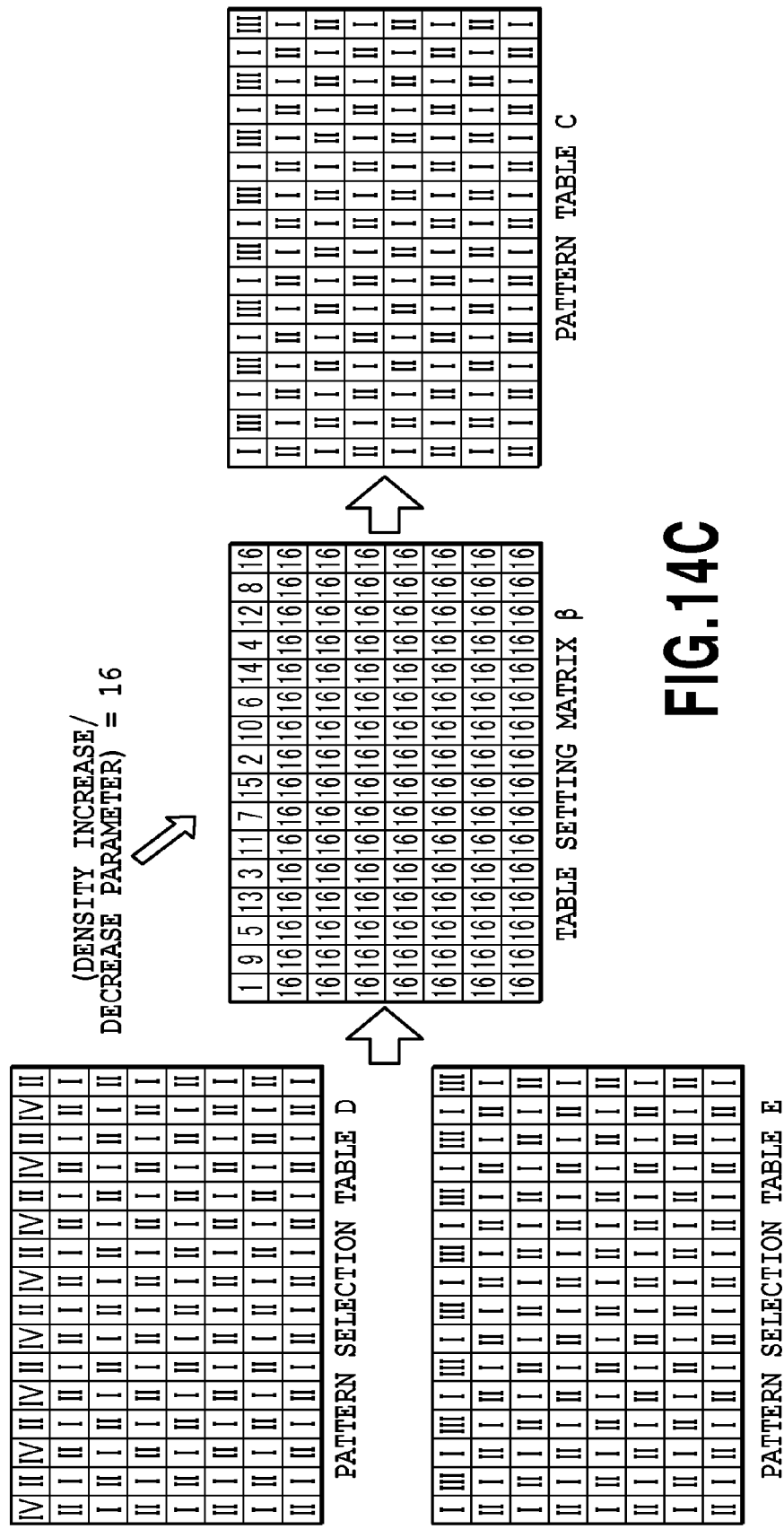

FIGS. 14A to 14C are diagrams each showing the way the pattern table C that is used actually at the of printing is obtained from the table setting matrix β shown in FIG. 13 and the density increase/decrease parameter P that is set, as in FIGS. 10A to 10C.

As above, by using both the pattern selection tables D and E shown in FIGS. 12A and 12B and the table setting matrix β shown in FIG. 13, the number of dots is adjusted only at the upper end of the unit region, and therefore, it is made possible to reduce the joint streak in a region narrower than that in the first embodiment. At this time, by referring to FIG. 13 again, it is known that in the table setting matrix β, parameters 1 to 16 are arranged in the Bayer arrangement even in the one-pixel width region. Consequently, in the present embodiment also, it is possible to eliminate the joint streak without making the texture or the feeling of granularity conspicuous.

In the above, the configuration in which the number of dots is adjusted at the upper end of the unit region is explained, but of course it is possible to adjust the number of dots at the lower end of the unit region. In this case, it is sufficient to prepare a pattern selection table by which dots are added or reduced compared to those at the center in the one-pixel width at the lower end and a table setting matrix in which one and the different one of parameters 1 to 16 is arranged in the Bayer arrangement in each pixel in the one-pixel width at the lower end.

Third Embodiment

In the above-described embodiment, the configuration is explained in which by adjusting the density increase/decrease parameter P in the range of 1 to 16, the increase/decrease of dots is adjusted and thus both the black streak and the white streak can be dealt with. However, in the printing apparatus, only the white streak or only the black streak is problematic in many cases, and in such cases, it is sufficient to deal with one of them.

FIG. 15 is a diagram showing an example of a dot arrangement pattern that is used in the case where only the black streak is problematic. At level 1, the number of dot printing pixels of the patterns I and II is one but the number of dot printing pixels of the patterns III and IV is zero. At level 2, the number of dot printing pixels of the patterns I and II is two, but the number of dot printing pixels of the patterns III and IV is one. In the pattern I and in the pattern II, the number of dot printing pixels for each level is the same, and in the pattern III and in the pattern IV, the number of dot printing pixels for each level is also the same, but the positions of the dot printing pixels are different therebetween.

Figure 16A:
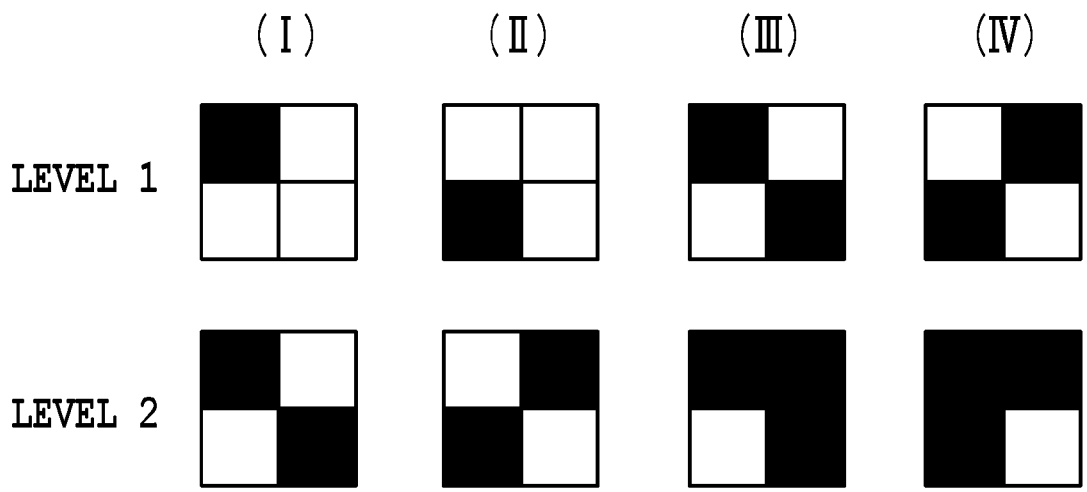
FIGS. 16A and 16B are diagrams showing examples of dot arrangement patterns that are used in the case where a white streak is problematic.
Figure 16B:
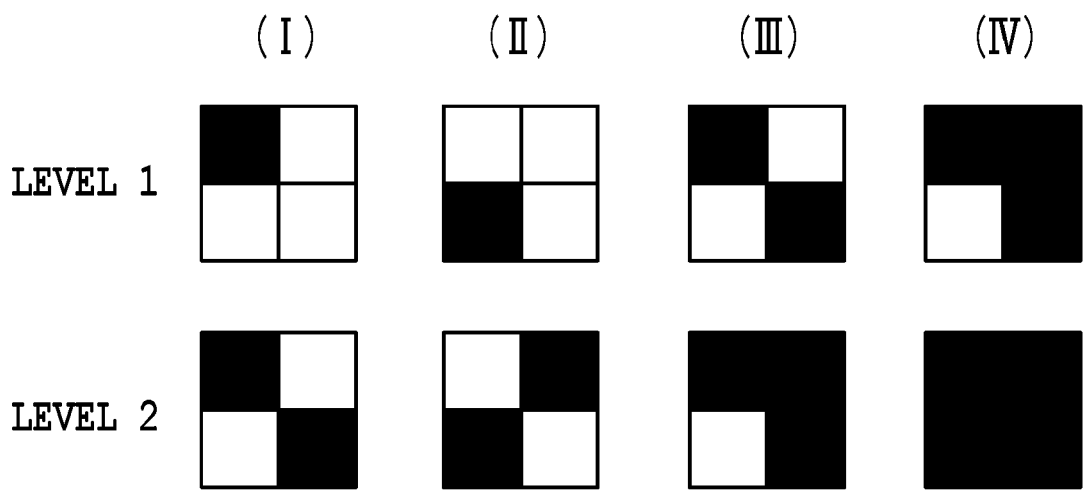

On the other hand, FIGS. 16A and 16B are diagrams showing examples of dot arrangement patterns that are used in the case where only the white streak is problematic. In each dot arrangement pattern, the number of dot printing pixels of the pattern III and the pattern IV is larger than the number of dot printing pixels of the pattern I and the pattern II at each level. However, in the dot arrangement pattern in FIG. 16A, the number of dot printing pixels of the pattern III and that of the pattern IV are the same at each level, but in the dot arrangement pattern in FIG. 16B, the number of dot printing pixels of the pattern IV is larger than that of the pattern III. By preparing the dot arrangement pattern as in FIG. 16B, it is possible to suppress the white streak by increasing dots more positively compared to the case where the dot arrangement pattern in FIG. 16A is used.

FIGS. 17A and 17B are diagrams showing pattern selection tables F and G that can be used together with each of the dot arrangement patterns shown in FIGS. 15, 16A, and 16B. In the pattern selection table F in FIG. 17A, in all the pixel regions, the patterns I and II are set alternately. In the case where the pattern selection table F is used together with the dot arrangement patterns shown in FIGS. 15, 16A, and 16B, dots are not increased or decreased in all the regions.

On the other hand, in the pattern selection table G shown in FIG. 17B, in the one-pixel width at the upper end and in the one-pixel width at the lower end, the patterns III and IV are set alternately and in the six-pixel width except for the upper end and the lower end, the patterns I and II are set alternately. In the case where the pattern selection table G is used together with the dot arrangement patterns shown in FIGS. 15, 16A, and 16B, in the one-pixel widths at the upper end and the lower end, printing is performed with more dots or less dots than those at the center.

In the present embodiment also, it is possible to use the table setting matrix α shown in FIG. 8. Then, in the case where the dot arrangement pattern shown in FIG. 15 is used together with the table setting matrix α, it is possible to make the black streak no longer conspicuous by reducing dots in the one-pixel with regions at the upper and lower ends. Further, in the case where the dot arrangement pattern shown in FIG. 16A or 16B is used together with the table setting matrix α, it is possible to make the white streak no longer conspicuous by adding dots in the one-pixel width regions at the upper and lower ends.

At this time, as already explained, in the table setting matrix α, parameters 1 to 16 are arranged in the Bayer arrangement in the two pixel rows that sandwich the boundary part on the paper surface. Consequently, both in the case where dots are increased and in the case where dots are decreased, it is possible to eliminate the joint streak without making the texture or the feeling of granularity conspicuous.

In the present embodiment also, it is possible to increase or decrease dots in the pixel row only at the upper end part or only at the lower end part of the unit region as in the second embodiment.

Figures 18A, 18B:
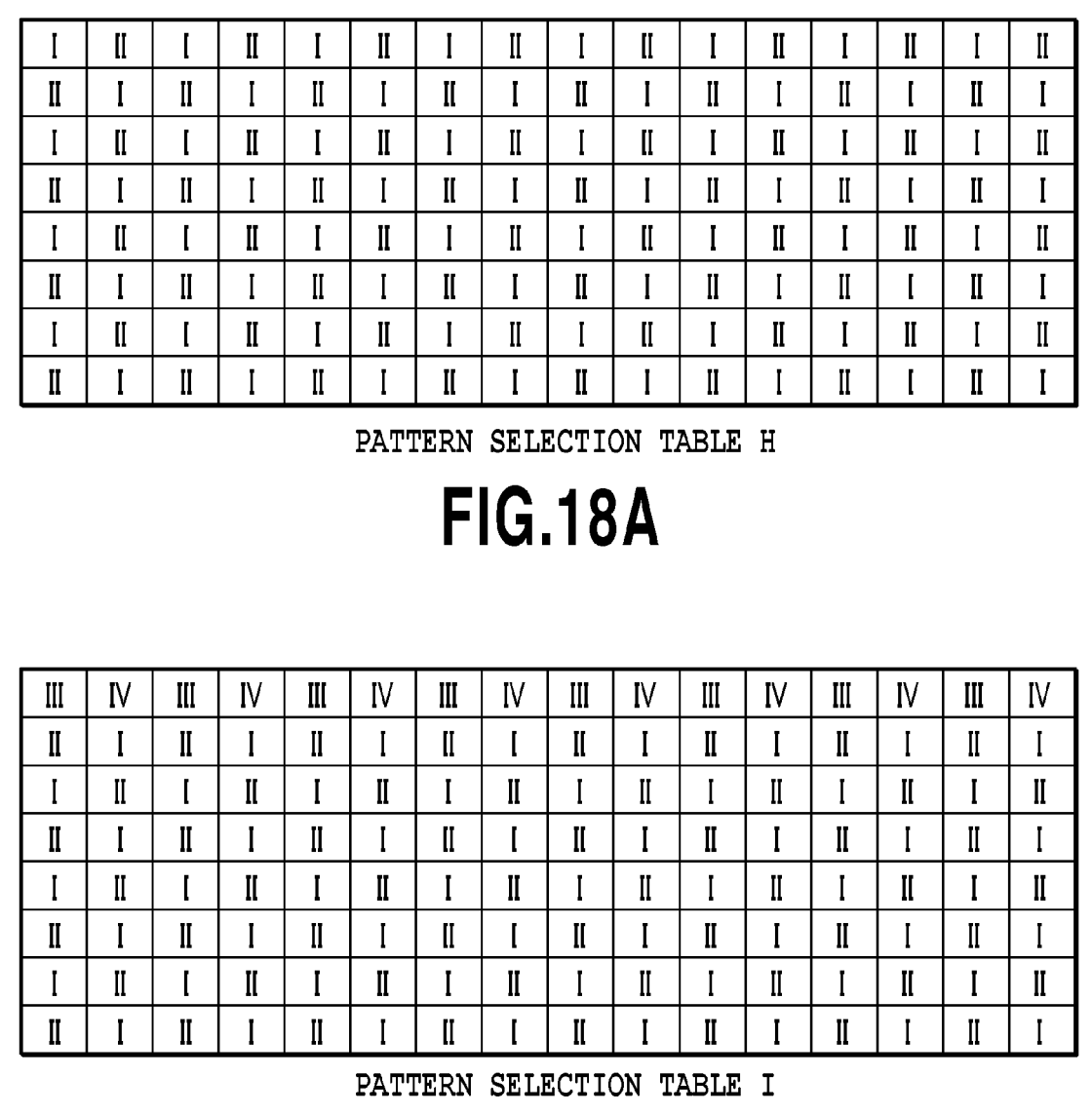
Figure 19:
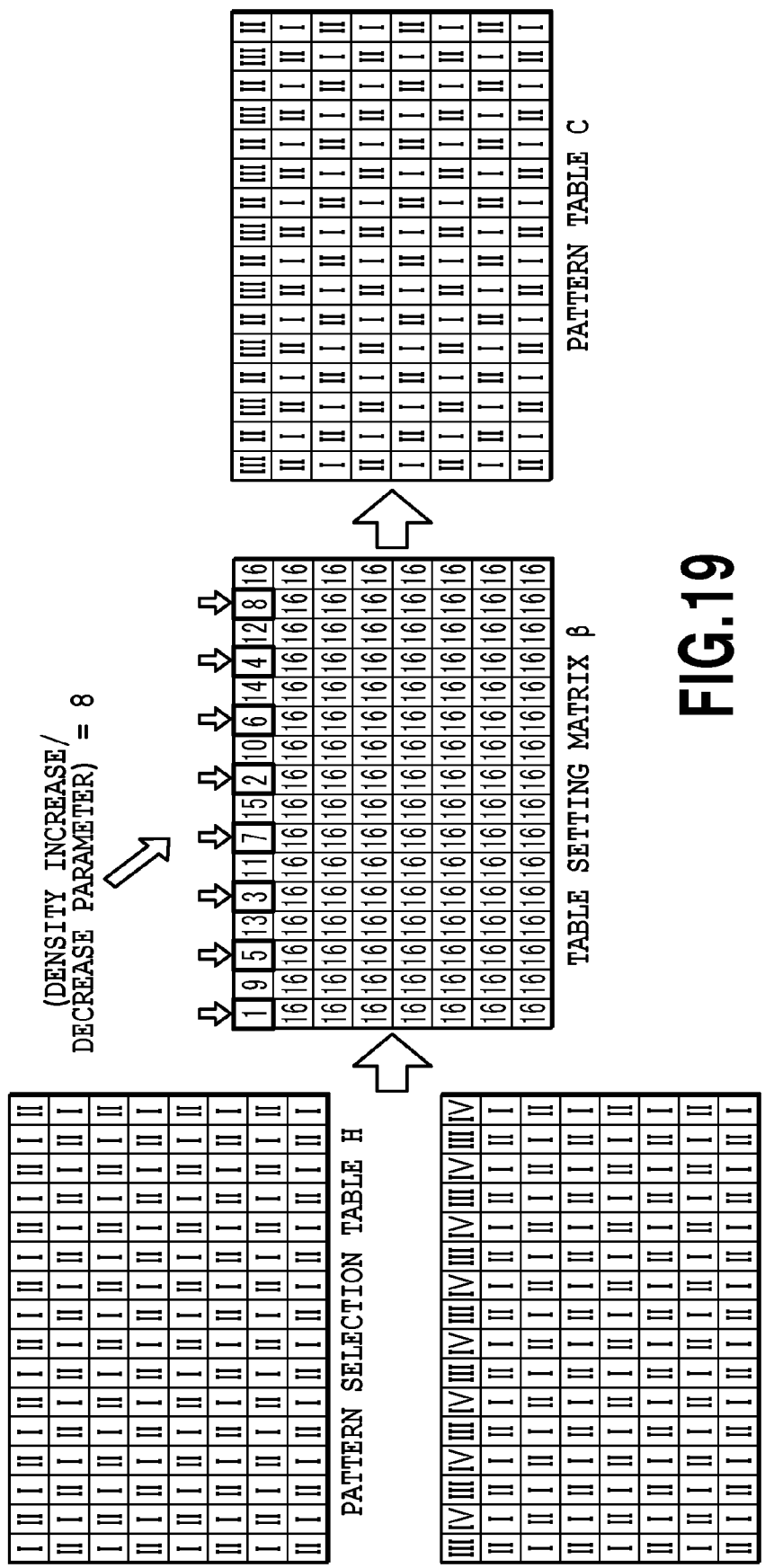
FIG. 19 is a diagram showing a method for obtaining a pattern table at the time of printing.

FIGS. 18A and 18B are diagrams showing pattern selection tables H and I that can be used at the time of adjusting the number of dots only at the upper end part of the unit region. By using the pattern selection tables H and I together with the table setting matrix β shown in FIG. 13 as in the second embodiment, it is made possible to increase or decrease dots only in the pixel row at the upper end part of the unit region. FIG. 19 is a diagram showing the way the pattern table C that is used at the time of printing is obtained from the table setting matrix β shown in FIG. 13 and the pattern selection tables H and I shown in FIGS. 18A and 18B in the case where the density increase/decrease parameter P is set to "8".

On the other hand, FIGS. 20A and 20B are diagrams showing pattern selection tables J and K that can be used at the time of adjusting the number of dots only at the lower end part of the unit region. FIG. 21 is a diagram showing a table setting matrix γ that can be used together with the pattern selection tables J and K shown in FIGS. 20A and 20B. In each pixel in the one-pixel width at the lower end, one and the different one of parameters 1 to 16 is allocated and in the other seven-pixel width region, 16 is allocated uniformly. By using the pattern selection tables J and K shown in FIGS. 20A and 20B together with the table setting matrix γ shown in FIG. 21, it is made possible to add (or reduce) dots in the pixel row at the lower end part of the unit region.

Both in the case where the number of dots is adjusted only at the upper end and in the case where the number of dots is adjusted only at the lower end, on a condition that the dot arrangement pattern shown in FIG. 15 is used together, it is possible to make the black streak no longer conspicuous by reducing the number of dots in the one-pixel width at the time of the black streak being problematic. Further, in the case where the dot arrangement pattern shown in FIG. 16A or 16B is used together, on a condition that the white streak is problematic, it is possible to make the white streak no longer conspicuous by increasing the number of dots in the one-pixel width. In the table setting matrix β and in the table setting matrix γ also, parameters 1 to 16 are arranged in the Bayer arrangement in the one pixel row at the upper end or the lower end of the boundary part. Consequently, in either case, it is possible to eliminate the joint streak without making the texture or the feeling of granularity conspicuous.

Fourth Embodiment

In the above-described embodiment, explanation is given by using the aspect in which the number of dots is adjusted in the two pixel rows that sandwich the boundary part or in the one pixel row on one side. However, the way dots spread on the printing medium varies in accordance with a variety of printing conditions, such as the combination of the printing medium and ink. Then, for example, in the case where dots spread widely across several pixels on the printing medium, there is a possibility that the joint steak will not be eliminated sufficiently even by adjusting the number of dots is only in the upper and lower one-pixel widths that sandwich the boundary part. In order to deal with such circumstances, in the present embodiment, a configuration in which the region in which the number of dots can be adjusted is further extended is explained.

FIGS. 22A and 22B are diagrams showing pattern selection tables L and M in the case where the number of dots is adjusted in the four pixel rows on one side (upper side) of the boundary part. In the pattern selection table L shown in FIG. 22A, the patterns I and II are set alternately in all the pixel regions. In the case where the pattern selection table L is used together with the dot arrangement pattern shown in FIG. 5, dots are not increased or decreased in all the regions.

On the other hand, in the pattern selection table M shown in FIG. 22B, in the four-pixel width on the upper side, the patterns III and IV are set alternately and in the four-pixel width on the lower side, the patterns I and II are set alternately. In the case where the pattern selection table M is used, in the four-pixel width on the upper side, dots is increased or decreased, and in the four-pixel width on the lower side, dots are not increased or decreased.

FIG. 23 is a diagram showing a table setting matrix δ corresponding to the pattern selection tables L and M shown in FIGS. 22A and 22B. In each pixel in the four-pixel width on the upper side, parameters 1 to 32 are arranged in the Bayer arrangement and in the four-pixel width region on the lower side, 32 is allocated uniformly. In the embodiment, a table by which a density increase/decrease parameter P of 0 to 32 is obtained from an evaluation value is prepared. Then, by setting the dot arrangement pattern of each pixel by using the combination of the table setting matrix δ and the pattern selection tables L and M, it is made possible to adjust the addition or reduction of dots across the four-pixel width without making the texture or the feeling of granularity conspicuous.

In the present embodiment, the case where the number of dots is adjusted in the four pixel rows on the upper side of the boundary part is explained, but of course, the present invention is not limited to the aspect such as this. It is also possible to adjust the number of dots only in a plurality of rows on the lower side or to adjust the number of dots in a plurality of rows on both sides sandwiching the boundary part.

In the table shown in FIG. 9, the evaluation values from 0 to 1020, which is the sum of each piece of the density data of each ink color, are divided equally into 16 steps and then the density increase/decrease parameter P is set, but of course, the relationship between the evaluation value and the density increase/decrease parameter P does not need to be such one. An aspect may be accepted in which the density increase/decrease parameter P is determined from the density data (0 to 255) for each ink color and the pattern table C is set for each ink color. In the present specification, the density increase/decrease parameter P is used to adjust the number of pixels for setting the dot arrangement pattern by which the number of dots that are added or reduced is increased or decreased from the default number in the boundary region. Consequently, in the case where the density increase/decrease parameter P by which an appropriate number of dots is printed in accordance with each of the evaluation values is set, the evaluation value and the density increase/decrease parameter P do not need to have such a linear relationship as in FIG. 9 and the density increase/decrease parameter P does not need to be set by referring to a table.

In the above, explanation is given by using the aspect in which the four kinds of dot arrangement patterns I to IV are prepared in each of the embodiments, but the present invention is not limited to this aspect. In the above explanation, the 2×2 dot arrangement patterns are used to convert the 600 dpi three-valued data into 1,200 dpi binary data, but in the case where the output resolution is further higher compared to the input resolution, the number of pixels that are included in the dot arrangement pattern also increases accordingly. In this case, it is also possible to prepare more kinds of dot arrangement patterns in which the method for arraying dots or the number of dots that are added (or reduced) is made different from one another.

In the case where the joint streak appears asymmetrically in the vertical direction with respect to the boundary part as a center, it is also possible to provide one- or more-pixel correction widths both at the upper end at and the lower end and then make the correction width at the upper end and that at the lower end different from each other. Anyway, in the case where pattern selection tables and a table setting matrix having an appropriate correction width at the upper end part and the lower end part, respectively, are prepared and parameters are arranged in the table setting matrix in a highly dispersed state, it is possible to obtain the effect of the present invention. At this time, the arrangement of parameters is not limited to the Bayer arrangement. For example, it is also possible to use a matrix having the blue noise characteristics. Anyway, in the case of the arrangement in which the low frequency components are suppressed than the high frequency components, it is possible to arrange dot arrangement patterns different from the default one in a highly dispersed state. As a result, it is made possible to effectively reduce the joint streak without causing the texture or the feeling of granularity in the vicinity of the boundary part.

In the above-described embodiment, the number of pixels in the Y direction of the pattern selection table and the table setting matrix is made equal to the number of pixels corresponding to the width of the eject port column that is used in printing, but the size of the pattern selection table and the table setting matrix is not limited to this. However, in order to match the correction width with the position of the joint streak at the time of arranging a plurality of pattern selection tables as in FIG. 6, the number of pixels in the Y direction of the pattern selection table and the table setting matrix needs to be an integer multiple of the unit region width, i.e., the eject port column width.

Further, a configuration may also be accepted in which a plurality of sets of a pattern selection table and a table setting matrix is prepared in advance and the set is selected or generated in accordance with the printing mode, the kind of printing medium, etc.

Furthermore, in the above, explanation is given on the assumption that the one-pass printing is performed, but it is possible to adopt the configuration of the present invention also in the case where the multi-pass printing is performed. In the multi-pass printing also, the position at which the joint streak appears is fixed, and therefore, it is possible to obtain the same effect as that in the above-described embodiment by preparing a pattern selection table and a table setting matrix the correction width of which is adjusted to such a position and by adjusting the correction width in accordance with printing conditions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-265364, filed Dec. 24, 2013, which is hereby incorporated by reference wherein in its entirety.

What is claimed is:

1. An image processing apparatus that performs processing on multivalued image data corresponding to a unit region for printing an image in the unit region including a plurality of image regions on a printing medium by ejecting ink to each of the plurality of image regions on the printing medium in accordance with dot printing data corresponding to each of a plurality of times of scan, which is a plurality of times of relative scan by an eject port column in which a plurality of eject ports for ejecting ink is arrayed in a predetermined direction and the printing medium, and by conveying the printing medium between the plurality of times of scan, the image processing apparatus comprising:
   a first acquisition unit configured to acquire information on a density of an image that is printed in the pixel region from multivalued image data corresponding to the unit region;
   a second acquisition unit configured to acquire N ($\geq 3$)-valued quantized data corresponding to the unit region based on the multivalued image data;
   a third acquisition unit configured to acquire a plurality of dot arrangement pattern groups including at least a first dot arrangement pattern group including a plurality of first dot arrangement patterns in which an arrangement of dots is determined so that the number and position of dots that are printed within the pixel region are different in accordance with a value of the N-valued quantized data and a second dot arrangement pattern group including a plurality of second dot arrangement patterns in which an arrangement of dots is determined so that the number and position of dots that are printed within the pixel region are different in accordance with a value of the N-valued quantized data;
   a setting unit configured to set one dot arrangement pattern group among the plurality of dot arrangement pattern groups acquired by the third acquisition unit in accordance with the positions of the plurality of pixel regions within the unit region; and
   a generation unit configured to generate the dot printing data based on the N-valued quantized data acquired by the second acquisition unit and the dot arrangement pattern group set by the setting unit,
   wherein the number of dots that are printed within the pixel region determined by the second dot arrangement pattern corresponding to the N-valued quantized data having a predetermined value is smaller than the number of dots that are printed within the pixel region determined by the first dot arrangement pattern corresponding to the N-valued quantized data having the predetermined value, and
   the setting unit sets the dot arrangement pattern group such that the number of the second dot arrangement pattern groups determined for the plurality of pixel regions located at an end part of the eject port column in the predetermined direction within the unit region in a case where the density of the image indicated by the information acquired by the first acquisition unit is a first value is smaller than the number of the second dot arrangement pattern groups determined for the plurality of pixel regions located at an end part of the eject port column in the predetermined direction within the unit region in a case where the density of the image indicated by the information acquired by the first acquisition unit is a second value lower than the first value.

2. The image processing apparatus according to claim 1, wherein the plurality of dot arrangement patterns further includes a third dot arrangement pattern group including a plurality of third dot arrangement patterns in which an arrangement of dots is determined such that the number and position of dots that are printed within the pixel region are different in accordance with a value of the N-valued quantized data, the number of dots that are printed within the pixel region determined by the third dot arrangement pattern corresponding to the N-valued quantized data having the predetermined value is larger than the number of dots that are printed within the pixel region determined by the first dot arrangement pattern corresponding to the N-valued quantized data having the predetermined value, and the setting unit sets the dot arrangement pattern group such that the number of the third dot arrangement pattern groups determined for the plurality of pixel regions located at an end part of the eject port column in the predetermined direction within the unit region in a case where the density of the image indicated by the information acquired by the first acquisition unit is the first value is smaller than the number of the third dot arrangement pattern groups determined for the plurality of pixel regions located at an end part of the eject port column in the predetermined direction within the unit region in a case where the density of the image indicated by the information acquired by the first acquisition unit is a third value higher than the first value.

3. The image processing apparatus according to claim 2, wherein the setting unit sets the dot arrangement pattern by using a first table in which the first dot arrangement pattern group or the second dot arrangement pattern group is set for each of the plurality of pixel regions within the unit region and a second table in which the first dot arrangement pattern group or the third dot arrangement pattern group is set for each of the plurality of pixel regions within the unit region.

4. The image processing apparatus according to claim 3, wherein the setting unit further uses a threshold value matrix in which a different threshold value is determined for each of the plurality of pixel regions within the unit region and selects the first table in a case where the density of the image indicated by the information acquired by the first acquisition unit is lower than a threshold value determined by the threshold value matrix and selects the second table in a case where the density of the image indicated by the information acquired by the first acquisition unit is equal to or higher than a threshold value determined by the threshold value matrix.

5. The image processing apparatus according to claim 4, wherein in the first table, in a pixel region located at a position corresponding to a pixel region whose threshold value determined by the threshold value matrix is equal to or higher than a first value, the second dot arrangement pattern group is set.

6. The image processing apparatus according to claim 5, wherein in the second table, in a pixel region located at a position corresponding to a pixel region whose threshold value determined by the threshold value matrix is equal to or lower than a second value, the third dot arrangement pattern group is set.

7. An image processing apparatus that performs processing on multivalued image data corresponding to a unit region for printing an image in the unit region including a plurality of image regions on a printing medium by ejecting ink to each of the plurality of image regions on the printing medium in accordance with dot printing data corresponding to each of a plurality of times of scan, which is a plurality of times of relative scan by an eject port column in which a plurality of eject ports for ejecting ink is arrayed in a predetermined direction and the printing medium, and by conveying the printing medium between the plurality of times of scan, the image processing apparatus comprising:

a first acquisition unit configured to acquire information on a density of an image that is printed in the pixel region from multivalued image data corresponding to the unit region;

a second acquisition unit configured to acquire N ($\geq 3$)-valued quantized data corresponding to the unit region based on the multivalued image data;

a third acquisition unit configured to acquire a plurality of dot arrangement pattern groups including at least a first dot arrangement pattern group including a plurality of first dot arrangement patterns in which an arrangement of dots is determined so that the number and position of dots that are printed within the pixel region are different in accordance with a value of the N-valued quantized data and a second dot arrangement pattern group including a plurality of second dot arrangement patterns in which an arrangement of dots is determined so that the number and position of dots that are printed within the pixel region are different in accordance with a value of the N-valued quantized data;

a setting unit configured to set one dot arrangement pattern group among the plurality of dot arrangement pattern groups acquired by the third acquisition unit in accordance with the positions of the plurality of pixel regions within the unit region; and a generation unit configured to generate the dot printing data based on the N-valued quantized data acquired by the second acquisition unit and the dot arrangement pattern group set by the setting unit, wherein the number of dots that are printed within the pixel region determined by the second dot arrangement pattern corresponding to the N-valued quantized data having a predetermined value is larger than the number of dots that are printed within the pixel region determined by the first dot arrangement pattern corresponding to the N-valued quantized data having the predetermined value, and the setting unit sets the dot arrangement pattern group such that the number of the second dot arrangement pattern groups determined for the plurality of pixel regions located at an end part of the eject port column in the predetermined direction within the unit region in a case where the density of the image indicated by the information acquired by the first acquisition unit is a first value is smaller than the number of the second dot arrangement pattern groups determined for the plurality of pixel regions located at an end part of the eject port column in the predetermined direction within the unit region in a case where the density of the image indicated by the information acquired by the first acquisition unit is a second value higher than the first value.

* * * * *